US010427655B2

(12) United States Patent
Nix

(10) Patent No.: US 10,427,655 B2
(45) Date of Patent: Oct. 1, 2019

(54) SYSTEMS AND METHODS FOR DETECTING SURPRISING EVENTS IN VEHICLES

(71) Applicant: Harman International Industries, Incorporated, Stamford, CT (US)

(72) Inventor: Axel Nix, Birmingham, MI (US)

(73) Assignee: Harman International Industries, Incorporated, Stamford, CT (US)

(*) Notice: Subject to any disclaimer, the term of this patent is extended or adjusted under 35 U.S.C. 154(b) by 146 days.

(21) Appl. No.: 15/331,685

(22) Filed: Oct. 21, 2016

(65) Prior Publication Data

US 2017/0113664 A1 Apr. 27, 2017

Related U.S. Application Data

(60) Provisional application No. 62/245,714, filed on Oct. 23, 2015.

(51) Int. Cl.
*B60T 7/12* (2006.01)
*G07C 5/08* (2006.01)
(Continued)

(52) U.S. Cl.
CPC ............. *B60T 7/12* (2013.01); *B60T 8/171* (2013.01); *B60T 8/17551* (2013.01);
(Continued)

(58) Field of Classification Search
CPC ........ B60T 7/12; B60T 8/171; B60T 8/17551; B60T 8/17558; B60T 8/241; B60T 8/32;
(Continued)

(56) References Cited

U.S. PATENT DOCUMENTS 6,831,556 B1 * 12/2004 Boykin .................. H04N 7/181
340/539.1
8,483,904 B2 * 7/2013 Viggers ............... G01M 17/007
348/148

(Continued)

FOREIGN PATENT DOCUMENTS

DE 19717226 A1 10/1998
DE 102008047727 A1 3/2010
WO 2010099416 A1 9/2010

OTHER PUBLICATIONS

European Patent Office, Extended European Search Report Issued in Application 16192975.7, dated Mar. 20, 2017, Germany, 10 pages.

*Primary Examiner* — Sze-Hon Kong
(74) *Attorney, Agent, or Firm* — McCoy Russell LLP

(57) ABSTRACT

A driver assistance system is presented, including an event detector which comprises a set of rules defining a surprising event based on signals reflecting a vehicle operator input signals from an object detection sensor. An event data file generator is configured to generate an event data file according to rules comprised in the event detector, the event data file comprising a video signal received from a camera, a signal from at least one dynamic vehicle sensor, and target object information received from the object detection sensor. The event data file generator is further configured to initiate data file generation responsive to a surprising event being detected by the event generator, and wherein the contents of the data file are specified by the rules comprised in the event detector. In this way, surprising events may be collected and analyzed off-board in order to generate updates for the driver assistance system.

20 Claims, 8 Drawing Sheets

(51) Int. Cl.

| | | |
|---|---|---|
| *G08B 13/196* | (2006.01) | |
| *G06F 11/30* | (2006.01) | |
| *G07C 5/00* | (2006.01) | |
| *B60T 8/171* | (2006.01) | |
| *B60T 8/1755* | (2006.01) | |
| *B60T 8/24* | (2006.01) | |
| *B60T 8/32* | (2006.01) | |
| *G06K 9/00* | (2006.01) | |
| *H04N 7/18* | (2006.01) | |
| *B60W 30/12* | (2006.01) | |
| *B60W 30/16* | (2012.01) | |
| *B60W 50/00* | (2006.01) | |
| *B60W 50/04* | (2006.01) | |

(52) U.S. Cl.
CPC .......... *B60T 8/17558* (2013.01); *B60T 8/241* (2013.01); *B60T 8/32* (2013.01); *B60W 30/12* (2013.01); *B60W 30/16* (2013.01); *G06F 11/3072* (2013.01); *G06K 9/00718* (2013.01); *G06K 9/00791* (2013.01); *G06K 9/00845* (2013.01); *G07C 5/008* (2013.01); *G07C 5/0841* (2013.01); *G07C 5/0891* (2013.01); *G08B 13/19669* (2013.01); *H04N 7/181* (2013.01); *H04N 7/188* (2013.01); *B60W 2050/0018* (2013.01); *B60W 2050/041* (2013.01); *B60W 2050/046* (2013.01); *B60W 2420/42* (2013.01); *B60W 2550/10* (2013.01); *B60W 2550/408* (2013.01); *G06K 2009/00738* (2013.01); *G07C 5/0866* (2013.01)

(58) Field of Classification Search
CPC .......... G06K 9/00718; G06K 9/00791; G06K 9/00845; G06K 2009/00738; H04N 7/181; H04N 7/188; G07C 5/085; G07C 5/008; G07C 5/0891; G07C 5/0858; G07C 5/0866; G07C 5/0841; H04L 41/069; G06F 11/30; G06F 11/3058; G06F 11/3072; G08B 13/19669; G08G 1/20; B60W 30/12; B60W 30/16
See application file for complete search history.

(56) References Cited

U.S. PATENT DOCUMENTS

| | | | |
|---|---|---|---|
| 9,036,026 B2 | 5/2015 | Dellantoni et al. | |
| 9,344,683 B1* | 5/2016 | Nemat-Nasser | B60R 11/04 |
| 9,365,162 B2 | 6/2016 | Nix | |
| 9,639,344 B2* | 5/2017 | Rockwell | G06F 8/65 |
| 2005/0216902 A1* | 9/2005 | Schaefer | G06F 8/61 |
| | | | 717/168 |
| 2006/0095175 A1* | 5/2006 | deWaal | G07C 5/008 |
| | | | 701/31.4 |
| 2007/0132773 A1* | 6/2007 | Plante | G07C 5/0891 |
| | | | 345/564 |
| 2007/0271105 A1* | 11/2007 | Gunderson | G06Q 10/087 |
| | | | 705/1.1 |
| 2008/0154691 A1* | 6/2008 | Wellman | G05D 1/0282 |
| | | | 705/7.26 |
| 2010/0246669 A1* | 9/2010 | Harel | G06F 11/1004 |
| | | | 375/240.02 |
| 2011/0224901 A1* | 9/2011 | Aben | G01C 21/32 |
| | | | 701/532 |
| 2013/0096731 A1* | 4/2013 | Tamari | G06F 11/3013 |
| | | | 701/1 |
| 2013/0227352 A1* | 8/2013 | Kumarasamy | G06F 11/3072 |
| | | | 714/47.1 |
| 2013/0278769 A1 | 10/2013 | Nix et al. | |
| 2013/0332601 A1* | 12/2013 | Nakil | G06N 99/005 |
| | | | 709/224 |
| 2014/0049646 A1 | 2/2014 | Nix | |
| 2014/0109075 A1* | 4/2014 | Hoffman | G06F 8/65 |
| | | | 717/169 |
| 2014/0192194 A1* | 7/2014 | Bedell | B60R 1/00 |
| | | | 348/148 |
| 2014/0306814 A1* | 10/2014 | Ricci | H04W 4/21 |
| | | | 340/425.5 |
| 2015/0088335 A1* | 3/2015 | Lambert | G08G 1/162 |
| | | | 701/1 |
| 2015/0135262 A1* | 5/2015 | Porat | G06F 21/552 |
| | | | 726/1 |
| 2015/0199815 A1* | 7/2015 | Jo | G06K 9/00771 |
| | | | 382/103 |
| 2015/0217765 A1* | 8/2015 | Tokoro | B60W 30/09 |
| | | | 701/1 |
| 2015/0254986 A1 | 9/2015 | Fairfield et al. | |
| 2015/0264321 A1 | 9/2015 | Dellantoni et al. | |
| 2015/0269790 A1* | 9/2015 | Batcheller | G08G 1/20 |
| | | | 701/537 |
| 2015/0287250 A1* | 10/2015 | Niwa | F16H 63/40 |
| | | | 701/51 |
| 2015/0356793 A1* | 12/2015 | Dietz | G07C 5/00 |
| | | | 701/1 |
| 2016/0042238 A1 | 2/2016 | Lynam et al. | |
| 2016/0050356 A1* | 2/2016 | Nalepka | H04N 5/23203 |
| | | | 348/148 |
| 2016/0098430 A1* | 4/2016 | Nakagawa | G06N 5/025 |
| | | | 707/754 |
| 2016/0173532 A1* | 6/2016 | Yoo | G06F 15/16 |
| | | | 726/1 |
| 2016/0173832 A1* | 6/2016 | Stewart | F41A 17/20 |
| | | | 348/158 |
| 2016/0210857 A1* | 7/2016 | Gao | G08G 1/09 |
| 2016/0277277 A1* | 9/2016 | Chan | H04L 41/0806 |
| 2016/0291940 A1* | 10/2016 | Searle | H04L 41/082 |
| 2016/0334797 A1* | 11/2016 | Ross | G08G 1/20 |
| 2017/0012812 A1* | 1/2017 | Gotoh | H04W 4/027 |
| 2017/0053504 A1* | 2/2017 | Zhang | G08B 13/19613 |
| 2017/0078922 A1* | 3/2017 | Raleigh | H04W 28/10 |
| 2017/0091872 A1* | 3/2017 | Okumura | G06Q 40/08 |
| 2017/0305440 A1* | 10/2017 | Oba | B60W 50/082 |
| 2018/0075538 A1* | 3/2018 | Konrardy | G06Q 40/08 |
| 2018/0108013 A1* | 4/2018 | Lesesky | G07C 5/085 |
| 2018/0194364 A1* | 7/2018 | Asakura | B60W 50/02 |

\* cited by examiner

SYSTEMS AND METHODS FOR DETECTING SURPRISING EVENTS IN VEHICLES

CROSS REFERENCE TO RELATED APPLICATIONS

The present application claims priority to U.S. Provisional Application No. 62/245,714, entitled "SYSTEMS AND METHODS FOR ADVANCED DRIVER ASSISTANCE ANALYTICS", filed on Oct. 23, 2015, the entire contents of which are hereby incorporated by reference for all purposes.

FIELD

The disclosure relates to systems and methods for identifying surprising events in motor vehicles, and in particular, to a system and method for monitoring the efficacy of driver assistance systems.

BACKGROUND

Increasingly, vehicles are equipped with advanced driver assistance (ADAS) systems. Driver assistance systems may assist the driver in controlling a vehicle, in identifying other vehicles and driving hazards, and in managing multiple vehicle systems simultaneously. Driver assistance systems may affect a driver's experience by reducing the burden of operating a vehicle, and by providing detailed information about the vehicle's environment that may not otherwise be apparent to the driver. Such systems may include adaptive cruise control (ACC) systems that relieve the driver of having to adjust the vehicle's speed when following another vehicle. The systems may also include lane keep assist (LKA) systems that apply torque to the steering wheel and aid a driver in maintaining a driving lane. Driver assistance system sensors may be configured to recognize objects in the path of the vehicle, which may enable a driver assistance system to take temporary control of vehicle systems such as steering and braking systems, and to perform corrective and/or evasive maneuvers.

Further, a driver assistance system may provide temporary relief for a driver, allowing the driver to ignore certain vehicle systems, and to focus on other activities. Continuous improvements in advanced driver assistance systems have enabled vehicles that can operate, at least partially, autonomously, controlling lateral and longitudinal movement of the vehicle without input from the driver. However, the inability to completely test ADAS systems, which are exposed to infinite combinations of driving situations, weather conditions, road conditions, and surrounding objects, among other changes to the environment, may reduce the effectiveness of the ADAS systems when operating under many (e.g., unpredictable) conditions.

SUMMARY

Embodiments are disclosed for an exemplary driver assistance system including an event detector which comprises a set of rules defining a surprising event based on a combination of at least two input signals. The at least two input signals may include a signal reflecting a vehicle operator input and a signal from an object detection sensor. An event data file generator is configured to generate an event data file according to rules comprised in the event detector. The event data file may comprise a video signal received from a camera, a signal from a dynamic vehicle sensor, and target object information received from the object detection sensor. The event data file generator is further configured to initiate data file generation responsive to a surprising event being detected by the event generator. The contents of the data file may be specified by the rules comprised in the event detector. In this way, surprising events may be collected and analyzed off-board in order to generate updates for the driver assistance system.

Methods are also disclosed for monitoring the efficacy of a driver assistance system. In one exemplary embodiment, data is received from one or more onboard vehicle sensors and one or more object identification sensors and stored in an event data buffer. A surprising event is detected from the received data based on surprise event rules stored at an event detector. An event data file is generated for the surprising event based on the surprise event rules, and uploaded to a driver assistance system server. An update module is received from the driver assistance system server comprising updated surprise event rules which are applied to the driver assistance system.

Further, methods are disclosed for updating a driver assistance system. In an example embodiment, a driver assistance system server receives an event data from a driver assistance system analytic module, the event data file comprising a video signal received from a camera, a signal from at least one dynamic vehicle sensor, and target object information received from the object detection sensor. The event data file is added to an event data cluster, which is then analyzed. A refined event detection ruleset is generated based on the analyzed event data cluster and issued to the driver assistance system analytic module.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
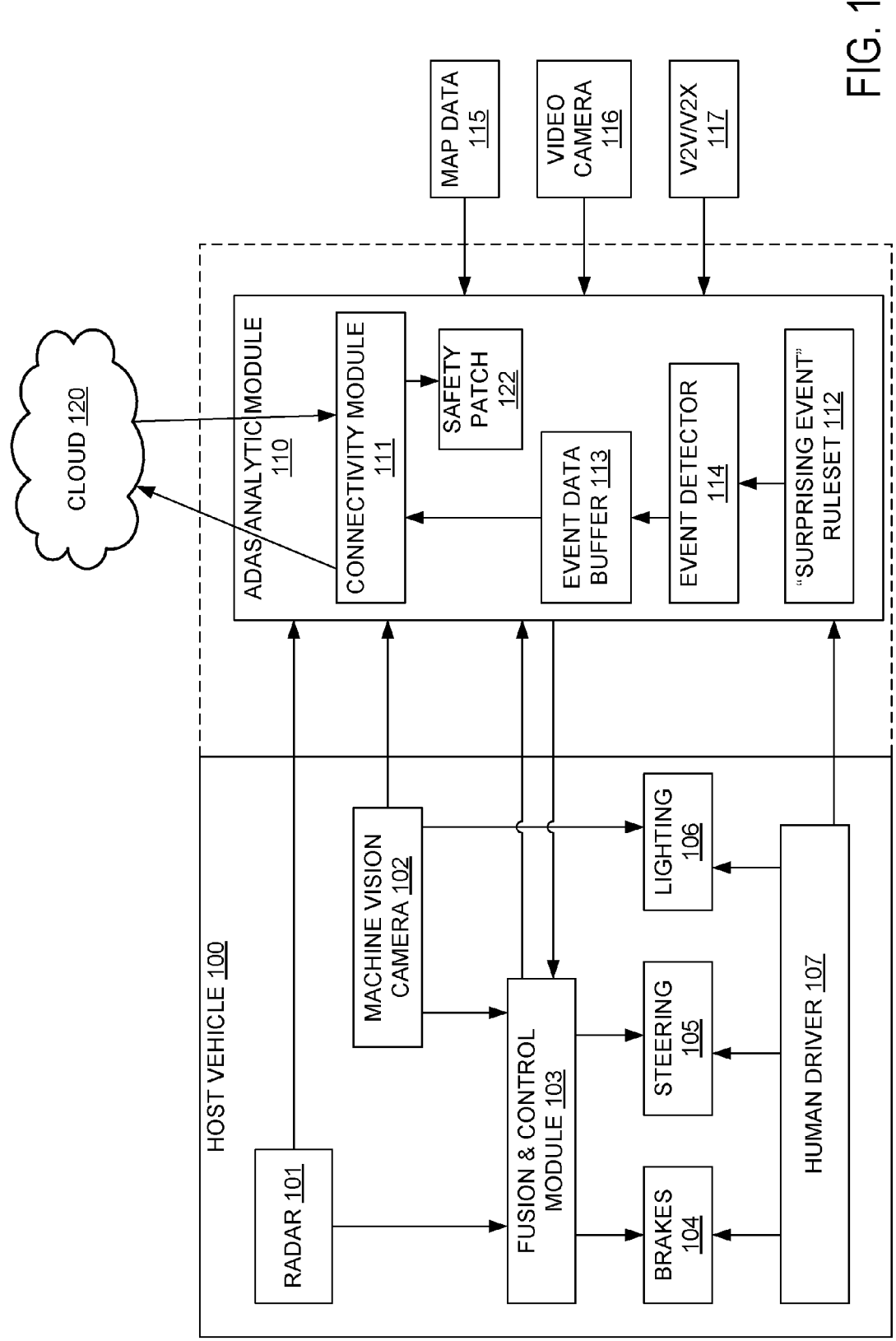
FIG. 1 shows an example block diagram of a system in accordance with one or more embodiments of the present disclosure.

Automobiles are increasingly using Advanced Driver Assistance Systems (ADAS systems) to support the driver and automate driving tasks. ADAS systems generally comprise sensors, such as radar sensors, lidar sensors, and machine vision cameras. The sensors may serve to identify the road and/or lane ahead, as well as objects such as other cars or pedestrians around the vehicle, such as those in the path of a host vehicle. These advanced driver assistance systems may warn a driver who is drifting out of the lane or about to collide with a preceding vehicle. More recently, ADAS systems may also assume control of the vehicle, e.g., by applying brakes to avoid or mitigate an impending collision or applying torque to the steering system to prevent the host vehicle from drifting out of the lane.

However ADAS systems may be prone to sensor failures and inconsistencies. For example, machine vision cameras may at times see "ghosts", or otherwise recognize targets that do not exist such as confusing steam from a manhole cover for an object. The systems may also suffer from misclassification. For example, a radar sensor may confuse a manhole cover for a small vehicle based on its radar signature. As a result, the ADAS systems may make non-ideal decisions, e.g., to apply emergency braking when such application is not warranted. As these types of events are relatively rare, it may take considerable time to collect enough data regarding "surprise" events in order to determine a root cause and to develop countermeasures. Further, once installed, most ADAS systems are not updated over the course of a model cycle, which may be two years or more.

While sensor failures may provide inaccurate data, the interpretation of sensor data may also be inconsistent or otherwise not representative of actual conditions, and thus lead to incorrect conclusions. For example, a vehicle may include evasive steering systems which steer around an object to avoid a collision. While evasive steering systems can prevent collisions at higher speeds that cannot be avoided by braking, the associated rapid change in trajectory may not be preferred by a user or otherwise may degrade a user's driving experience. Many vehicles may not include evasive steering systems in order to avoid the potential degradation of user driving experience. In prior systems, there were no effective methods of testing the efficacy and failure rate of evasive steering systems. The developer of an evasive steering system may not know every possible instance in which the sensors or decision algorithms will function in a degraded manner, and consequently an evasive steering system may not be completely modeled or tested. Also, decision algorithms may be based on convolutional neural networks and be non-deterministic, thus causing challenges in validating the algorithms' fitness in applications such as evasive steering.

This disclosure provides systems and methods for identifying surprise events with an ADAS system, for generating an event data file comprising the outputs of various vehicle sensors, and for uploading such event data files to an analytics cloud server. Further, embodiments are presented for processing and analyzing event data files received at an analytics cloud server, and for issuing update patches to ADAS systems which may alter how surprising events are identified and how data collected around the time of a surprising event is handled. Update patches may adjust the rules for event data collection, and may update ADAS system software and firmware, based on the analysis of clustered surprising events at the analytics cloud server.

FIG. 1 shows an example block diagram of a system to detect surprising events in a host vehicle 100. The host vehicle 100 may include a radar sensor 101 and a machine vision camera 102. The radar sensor 101 may be configured to identify and track vehicles, pedestrians, bicyclists, rough roads, potholes, and other objects and report those objects to a fusion and control module 103. For example, the radar sensor 101 may communicate with a fusion and control module 103 over a vehicle data network such as a CAN bus, Flexray, or Ethernet. A machine vision camera 102 may be provided to identify objects and report those objects to the fusion and control module 103. The machine vision camera 102 may also identify lane markings and report the curvature of the road ahead to the fusion and control module 103. It should be understood that the radar sensor 101 and machine vision camera 102 here are exemplary to represent any number of possible sensors. In practice, a vehicle may have many more sensors than the two illustrated. For example, vehicles may utilize multiple radar sensors and cameras which face in different directions, have different ranges, and have different fields of view.

The fusion and control module 103 may process information received from the radar sensor 101 and the machine vision camera 102 and calculate vehicle control actions in response thereto. The fusion and control module 103 may communicate with the vehicle's brakes 104 to initiate braking if the sensor data indicates the presence of an object ahead and in the path of the host vehicle. The fusion and control module 103 may also communicate with the vehicle's steering system 105 to apply torque to the steering and prevent the host vehicle from drifting out of the lane or to steer around an object in the path of the host vehicle 100. Separately, the machine vision camera 102 may communicate with the vehicle lighting system 106 to automatically enable high beam when no preceding or oncoming traffic would be affected by glare, and automatically switch to low beam in order to avoid glaring others.

Depending on the level of automation, the described system may warn the human driver 107 of the host vehicle 100, take automatic action if the human driver 107 appears inattentive, or take over control of the vehicle 100 to allow the human driver 107 to focus on other tasks than driving. A highly automated vehicle 100 in which the fusion and control module 103 controls the longitudinal and lateral movement of the vehicle on behalf of the human driver 107 may be configured to do so in every situation, including during rare events that occur very infrequently, e.g. less than once in one million km of driving. In prior systems, validation of sensors and control algorithms has been labor-intensive, limited in scope, and generally unable to detect rare events.

The disclosed system and method for detecting surprising events eliminates these disadvantages by use of an ADAS analytics module 110 which may be cost-effectively deployed within mass-produced vehicle, and, for example, as a feature within an existing computing system within such mass-produced vehicles. The ADAS analytics module 110 may receive information from ADAS sensors, e.g. the radar sensor 101 and the machine vision camera 102. The ADAS analytics module may also receive object information and vehicle control outputs from the fusion and control module 103. The ADAS analytics module further receives information related to actions by the human driver 107, e.g. brake pedal and accelerator position, lighting switch information, and generally any information indicative of vehicle control actions by the human driver 107.

Implemented within the ADAS analytics module 110 is an event detector 114 to identify "surprising events". A surprising event may be defined according to a surprising event rule set 112 which is stored within the ADAS analytics module 110 and may be updated over the air from a cloud server 120. The surprising event rule set 112 may identify various types of surprises, e.g. sensor inconsistencies that indicate potential sensor problems. The surprising event rule set 112 may identify surprising events with the benefit of hindsight: An unexpected, thus surprising, sensor degradation may be identified after the fact, e.g., when the sensor has already degraded.

The surprising event rule set 112 may identify issues by identifying actions of the human driver 107 that are inconsistent with automated driving outputs of the fusion and control module 103. The event detector 114 may utilize map data 115 and/or vehicle to vehicle or vehicle to infrastructure (generically V2X) data 117 to identify surprising events. The event detector 114 may utilize map data 115 to calculate a theoretical sensor range and compare object data from the radar sensor 101 and the machine vision camera 102 with V2V information 117 to identify onboard sensor degradation.

When a surprising event has been detected, a data snapshot may be stored in an event data buffer 113, for example a RAM or flash memory buffer. The data snapshot may comprise data from a vehicle data bus, and comprise data received before the event was detected and after the event was detected. The surprising event rule set 112 may comprise instructions controlling which data to compile in the data snapshot. The compiled data may include video data from a video camera 116. The video camera 116 may be the front camera of a surround view camera system or an augmented reality camera mounted in vehicle 100 having a forward field of view in some examples. The video camera 116 may be connected to the ADAS analytics module 110 through a surround view module (not shown) which is configured to by default forward an image from a front camera to the ADAS analytics module.

Data snapshots stored in the event data buffer 113 may be uploaded to a cloud server 120 through a connectivity module 111, e.g. a cellular communication modem, a WiFi connection, or any other wireless communication channel. The surprising event rule set 112 may comprise instructions controlling which, of multiple available communication channels, data is uploaded from the event data buffer 113 through the connectivity module 111. In particular, the surprising event rule set 112 may prioritize events by importance and identify uploaded channels to minimize data transmission cost.

The event detector 114 may include an abstraction layer that translates vehicle-specific data bus signals into generic information. For example, one particular vehicle may be controlled to transmit vehicle speed in m/s on its internal CAN bus, while another transmits vehicle speed in km/h. The abstraction layer may translate a vehicle-specific vehicle speed signal into a standardized vehicle-speed signal for use in data snapshots.

Data snapshots that have been uploaded to the cloud server 120 may be analyzed to identify potential vehicle defects. The cloud server 120 may utilize manual and automatic review processes and utilize algorithms that are more computationally intensive than algorithms that could be calculated in the radar sensor 101, the machine vision camera 102, or the fusion and control module 103. The cloud server 120 may also employ analysis algorithms and techniques that were not available at the time the radar sensor 101, the machine vision camera 102 and the fusion and control module 103 were developed.

Vehicle defects that have been identified may be communicated to the related parties to guide future development and sensor improvement. Additionally, the cloud server 120 may be used to load a safety patch into a safety patch storage 118 into the ADAS analytics module 110. The safety patch 122 may be used to provide feedback 119 to the fusion and control module 103. For example, a safety patch may indicate reduced reliability of the radar sensor 101 or the machine vision camera 102 in a certain geographical area or under certain driving conditions.

Figure 2:
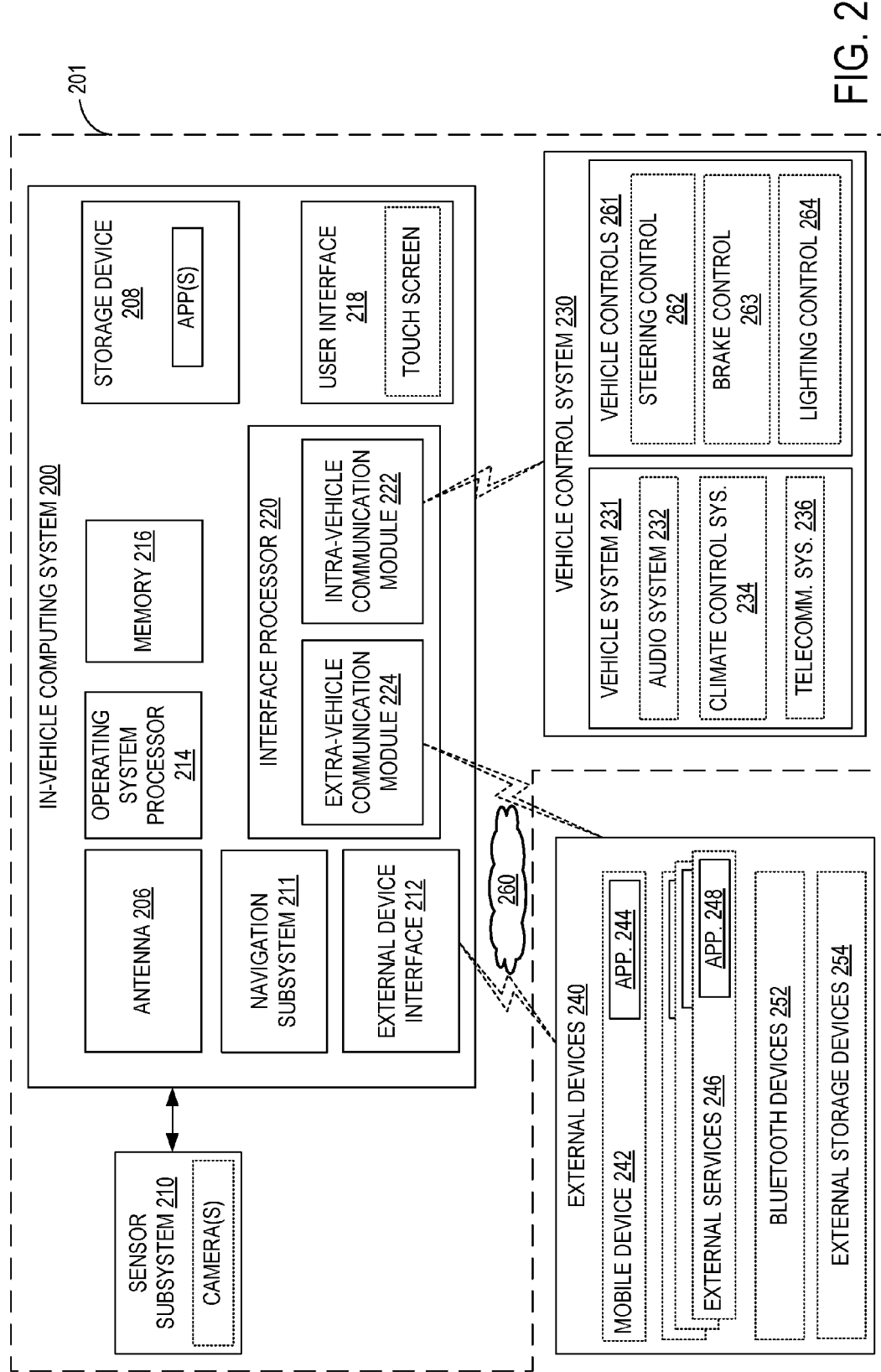
FIG. 2 shows a block diagram of an in-vehicle computing system in accordance with one or more embodiments of the present disclosure.

FIG. 2 shows a block diagram of an in-vehicle computing system 200 inside vehicle 201. The in-vehicle computing system 200 may be an example of an in-vehicle computing system that includes one or more of the modules and other elements illustrated in FIG. 1. The in-vehicle computing system 200 may perform one or more of the methods described herein in some embodiments. In some examples, the in-vehicle computing system 200 may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

The in-vehicle computing system 200 may include one or more processors including an operating system processor 214 and an interface processor 220. The operating system processor 214 may execute an operating system on the in-vehicle computing system, and control input/output, display, and other operations of the in-vehicle computing system. The interface processor 220 may interface with a vehicle control system 230 via an intra-vehicle communication module 222.

The intra-vehicle communication module 222 may output data to other vehicle systems 231 and vehicle control elements 261, while also receiving data input from other vehicle components and systems 231, 261, e.g. by way of vehicle control system 230. When outputting data, the intra-vehicle communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine or other vehicle-related information may be communicated and a multimedia data network through which multimedia data, such as recorded image/video data, is communicated between multimedia components, such as audio/video recorders, in or on the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, a brake/accelerator pedal position, etc. In addition, other interfacing mechanisms such as Ethernet may be used as well without departing from the scope of this disclosure.

Non-volatile storage device 208 may be included in in-vehicle computing system 200 to store data such as instructions executable by the processors 214 or 220 in non-volatile form. The storage device 208 may store application data to enable the in-vehicle computing system 200 to run an application for connecting to a cloud-based server and/or collecting information for transmission to the cloud-based server. Connection to a cloud-based server may be mediated via an extra-vehicle communication module 224. The application may retrieve information gathered by vehicle systems/sensors, input devices (e.g., user interface 218), devices in communication with the in-vehicle computing system (e.g., a mobile device connected via a Bluetooth link), etc. The storage device 208 may additionally or alternatively store application data to enable the in-vehicle computing system 200 to run an application for analyzing received information (e.g., information received from the cloud-based server and/or via one or more data sources, such as vehicle sensors and/or user interfaces) to detect surprising events in a vicinity of the vehicle. For example, the application may execute one or more of the algorithms described herein to determine a surprising event using input from a radar, machine vision camera, map data, video camera data, vehicle-to-vehicle and/or vehicle-to-infrastructure, and/or other data.

The in-vehicle computing system 200 may further include a volatile memory 216. The volatile memory 216 may be random access memory (RAM). Non-transitory storage devices, such as non-volatile storage device 208 and/or volatile memory 216, may store instructions and/or code that, when executed by a processor (e.g., the operating system processor 214 or the interface processor 220), controls the in-vehicle computing system 200 to perform one or more of the actions described in the disclosure.

One or more additional sensors may be included in a sensor subsystem 210 in communication with the in-vehicle computing system 200. For example, the sensor subsystem 210 may include a camera, such as a rear view camera for assessing features (e.g., obstacles, other vehicles, pedestrians, etc.) of the environment behind the vehicle, a cabin camera for identifying a user or user inputs (e.g., using facial recognition and/or user gestures), and/or a front view camera to assess features of the environment ahead of the vehicle. Sensor subsystem 210 of in-vehicle computing system 200 may communicate with and receive inputs from various vehicle sensors and may further receive user inputs. For example, the inputs received by sensor subsystem 210 may include inputs from adaptive damping systems, air suspension controls, suspension sensors, shock sensors, other sensors indicating vertical, lateral, or longitudinal movement of the vehicle, transmission gear position, transmission clutch position, gas pedal input, brake input, transmission selector position, vehicle speed, vehicle yaw rate, vehicle lateral acceleration, vehicle longitudinal acceleration, steering angle, steering wheel angle, tire pressure monitoring system, seat belt tension sensors, occupancy indicators, weight indicators, payload indicators, brake pad wear indicators, tire temperature indicators, engine speed, mass airflow through the engine, ambient temperature, intake air temperature, vehicle inclination, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc.

While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver. The navigation subsystem 211 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 211 may communicate with motion and rotation sensors included in the sensor subsystem 210. Alternatively, the navigation subsystem 211 may include motion and rotation sensors and determine the movement and rotation based on the output of these sensors. Navigation subsystem 211 may transmit data to, and receive data from a cloud-based server and/or external navigation service via extra-vehicle communication module 224.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

One or more applications 244 may be operable on mobile device 242. As an example, mobile device application 244 may be operated to aggregate user data regarding interactions of the user with the mobile device and/or to identify environmental conditions of the user while the user is located in the vehicle. For example, mobile device application 244 may aggregate positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from the in-vehicle computing system (e.g., sensor data, log files, user input, etc.), etc. The collected data may be transmitted to another device and/or analyzed by the application to determine a context of the driver, vehicle, and environment and perform an action based on the context (e.g., altering operation of an ADAS system).

Vehicle control system 230 may include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), brake controls 263, lighting controls 264 (e.g., cabin lighting, external vehicle lighting, light signals) as well as instrument panel controls, microphone(s), accelerator/clutch pedals, a gear shift, door/window controls positioned in a driver or passenger door, seat controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via intra-vehicle communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206, which may be communicatively coupled to external device interface 212 and/or extra-vehicle-communication module 224. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface.

Figure 3:
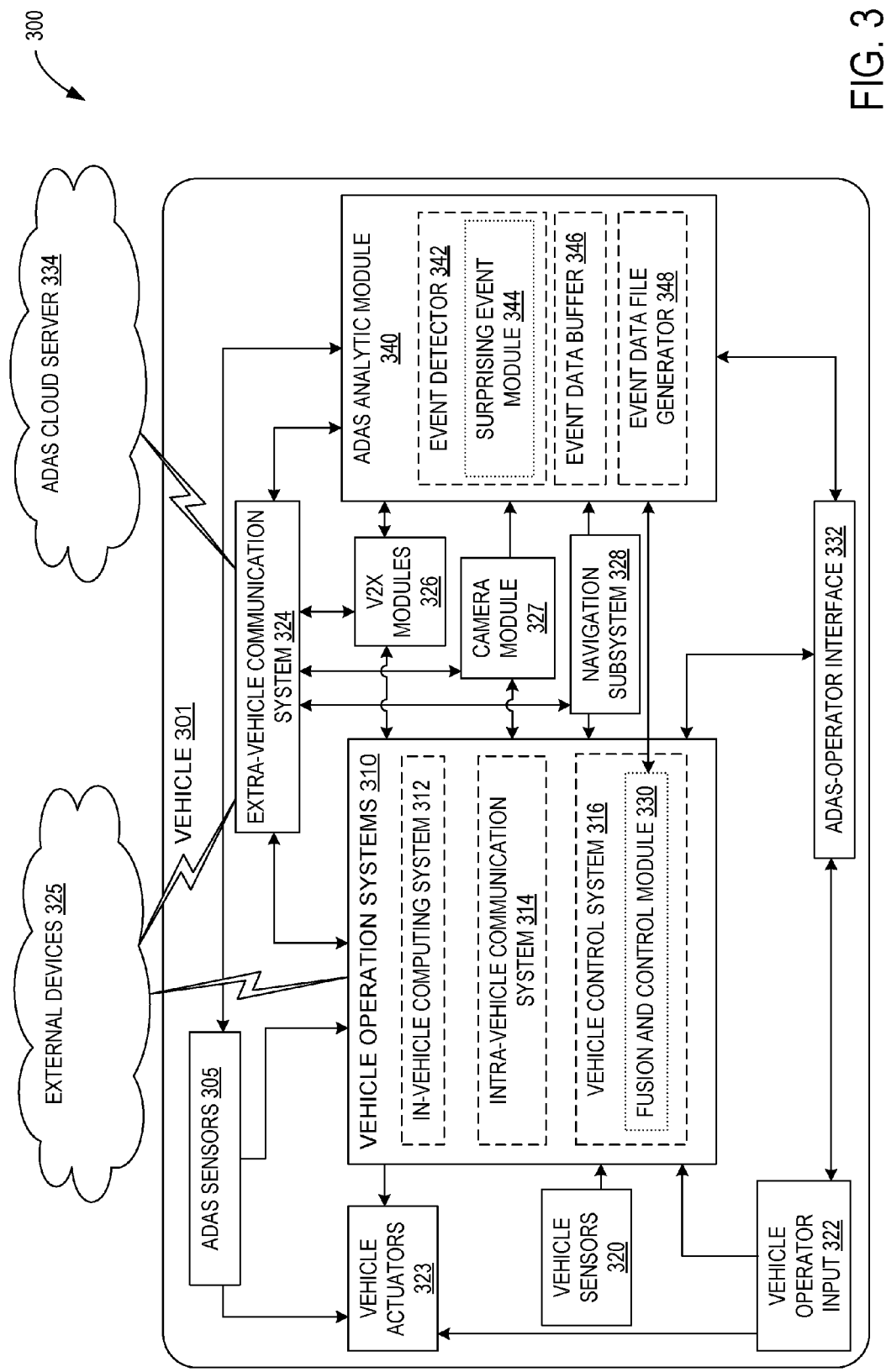
FIG. 3 shows a block diagram of an advanced driver assistance system in accordance with one or more embodiments of the present disclosure.

FIG. 3 is a block diagram illustration of an example advanced driver assistance system (ADAS) 300. ADAS 300 may be configured to provide driving assistance to an operator of vehicle 301. For example, certain driving tasks may be automated, the driver may be alerted to environmental objects and conditions, the alertness of the driver may be monitored, and in some examples, vehicle controls may be assumed by ADAS 300, overriding vehicle operator input.

ADAS 300 may include ADAS sensors 305 installed on or within vehicle 301. ADAS sensors 305 may be configured to identify the road and/or lane ahead of vehicle 301, as well as objects such as cars, pedestrians, obstacles, road signs, etc. in the vicinity of vehicle 301. ADAS sensors 305 may comprise, but are not limited to, radar sensors, lidar sensors, ladar sensors, ultrasonic sensors, machine vision cameras, as well as position and motion sensors, such as accelerometers, gyroscopes, inclinometers, and/or other sensors such as the sensors described for sensor subsystem 210. Example ADAS sensors 305 are described in further detail with reference to FIG. 4.

Vehicle 301 may include vehicle operation systems 310, including in-vehicle computing system 312, intra-vehicle computing system 314, and vehicle control system 316. In-vehicle computing system 312 may be an example of in-vehicle computing systems 109 and/or 200. Intra-vehicle communication system 314 may be an example of intra-vehicle communication module 222, and may be configured to mediate communication among the systems and subsystems of vehicle 301. Vehicle control system 316 may be an example of vehicle control system 230, such as vehicle controls 261 of FIG. 2.

Vehicle operation systems 310 may receive input and data from numerous sources, including ADAS sensors 305 and vehicle sensors 320. Vehicle sensors 320 may include engine parameter sensors, battery parameter sensors, vehicle parameter sensors, fuel system parameter sensors, ambient condition sensors, cabin climate sensors, etc. Vehicle operation systems 310 may further receive vehicle operator input 322, which may be derived from a user interface, and/or through the vehicle operator interacting with one or more vehicle actuators 323, such as a steering wheel, gas/brake/accelerator pedals, gear shift, etc.

Extra-vehicle communication system 324 may enable vehicle-operating systems 310 to receive input and data from external devices 325 as well as devices coupled to vehicle 301 that require communication with external devices 325, such as V2X 326, camera module 327, and navigation subsystem 328. Extra-vehicle communication system 324 may be an example of extra-vehicle communication system 224 of FIG. 2, and may comprise or be coupled to an external device interface, such as external device interface 212, and may additionally or alternatively include or be coupled to an antenna, such as antenna 206.

External devices 325 may include but not be limited to any or all of external devices 240, such as external services 246 of FIG. 2. Information exchanged with external devices 325 may be encrypted or otherwise adjusted to ensure adherence to a selected security level. In some embodiments, information may only be exchanged after performing an authentication process and/or after receiving permission from the sending and/or received entity. External devices 325 may include one or more V2X services which may provide data to V2X modules 326. V2X modules 326 may include vehicle-to-vehicle (V2V) modules as well as vehicle-to-infrastructure (V2I) modules. V2X modules 326 may receive information from other vehicles/in-vehicle computing systems in other vehicles via a wireless communication link (e.g., BLUETOOTH, WIFI/WIFI-direct, near-field communication, etc.). V2X modules 326 may further receive information from infrastructure present along the route of the vehicle, such as traffic signal information (e.g., indications of when a traffic light is expected to change and/or a light changing schedule for a traffic light near the location of the vehicle).

External devices 325 may include one or more camera services, which may provide data to camera module 327. A camera service may provide data from, and/or facilitate communication with cameras external to vehicle 301, such as cameras in other vehicles, traffic cameras, security cameras, etc. Similarly, camera module 327 may export data received from one or more cameras mounted to vehicle 301 to external camera services.

External devices 325 may include one or more navigation services, which may provide data to navigation subsystem 328. Navigation subsystem 328 may be an example of navigation subsystem 211, and may be configured to receive, process, and/or display location information for the vehicle, such as a current location, relative position of a vehicle on a map, destination information (e.g., a final/ultimate destination), routing information (e.g., planned routes, alternative routes, locations along each route, traffic and other road conditions along each route, etc.), as well as additional navigation information.

As part of ADAS system 300, vehicle control system 316 may include fusion and control module 330. Fusion and control module 330 may receive data from ADAS sensors 305, as well as vehicle sensors 320, vehicle operator input 322, V2X modules 326, camera module 327, navigation subsystem 328, other sensors or data sources coupled to vehicle 301, and/or via extra-vehicle communication system 324. Fusion and control module 330 may validate, parse, process, and/or combine received data, and may determine control actions in response thereto. In some scenarios, fusion and control module 330 may provide a warning to the vehicle operator via ADAS-operator interface 332. ADAS-operator interface 332 may be incorporated into a generic user interface, such as user interface 218. For example, a warning may comprise a visual warning, such as an image and/or message displayed on a touch-screen display or dashboard display, or via a see-through display coupled to a vehicle windshield and/or mirror. In some examples, an audible warning may be presented via the vehicle audio system, such as an alarm or verbalized command. In some examples, a warning may comprise other means of alerting a vehicle operator, such as via a haptic motor (e.g., within the vehicle operator's seat), via the vehicle lighting system, and/or via one or more additional vehicle systems.

In some scenarios, fusion and control module 330 may take automatic action via vehicle actuators 323 if the vehicle operator appears inattentive, or if immediate action is indicated. For example, fusion and control module 330 may output a signal to a vehicle steering system responsive to an indication that the vehicle drifting out of a traffic lane, or may output a signal to a vehicle braking system to initiate emergency braking if the received sensor data indicates the presence of an object ahead of and in the path of vehicle 301.

ADAS-operator interface 322 may be a module or port for receiving user input from a user input device connected to the fusion and control module, from a touch-sensitive display, via a microphone, etc. In some examples, the vehicle operator may request to cede control of the vehicle for a duration via ADAS-operator interface 322. Fusion and control module 330 may then take over control of all or a subset of vehicle actuators 323 in order to allow the vehicle operator to focus on other tasks than driving. Additional examples and details of fusion and control module 330 operation are provided herein and with regard to FIG. 4.

Fusion and control module 330 may periodically export data to an analytics cloud server 334. For example, following an event which led to fusion and control module overriding vehicle operator input 322, pertinent event data may be exported via extra-vehicle communication system 324. As a non-limiting example, vehicle make, model, and identification information, a vehicle location retrieved from navigation subsystem 328, snapshots from one or more cameras retrieved from camera module 327, and output of one or more ADAS sensors 305 and/or one or more vehicle sensors 320 from a duration before and after the event may be bundled together, timestamped, and then exported. Analytics cloud server 334 may include one or more modules for receiving, processing, and analyzing data received from fusion control modules installed in multiple vehicle systems, and may be configured to bundle data from similar events in order to identify potential vehicle and/or ADAS system defects. Additional details pertaining to analytics cloud server 334 are provided herein and with reference to FIG. 6.

Typically, ADAS systems are developed based on a traditional automotive development approach, in which the systems are tested during a development phase. Following the development phase, the hardware and software of the ADAS sensors 305 and fusion and control module 330 are frozen as the vehicle enters mass production. Testing of vehicles during development may be limited (e.g. 500,000 km driven) and may come at a very high cost to vehicle manufacturers.

Such an approach may not identify rare events prior to freezing production parameters. For example, events that occur only once in 10 million kilometers of travel may not be acknowledged during the testing and development phases. Table 1 shows exemplary occurrences of a rare 1:10,000,000 km event over time, both before and after start of production (SOP) of a vehicle platform that is assumed to produce 500,000 vehicles per year.

TABLE 1

|  | at SOP | after 1 year | after 2 years |
|---|---|---|---|
| Total vehicles sold | 0 | 500,000 | 1,000,000 |
| Total fleet travel | 0.5 million km | 5.4 billion km | 21.7 billion km |
| Total rare events encountered | 0 total | 543 total | 2,171 total |
| Rare events frequency | 0 per day | 3 per day | 6 per day |

In order to enhance the function and performance of ADAS system 300 following SOP, rare events may be identified and systematically categorized, and software and/or firmware patches may be distributed for installation in ADAS enabled vehicles. In one example, rare events may be collected at individual vehicles using an ADAS analytic module 340. Data snapshots from each rare event may then be uploaded to analytics cloud server 334, where they may be analyzed. Analytics cloud server 334 may then issue patches based on the collected rare event data.

ADAS analytics module 340 may receive information from ADAS sensors 305, as well as object information, vehicle control outputs, vehicle sensor outputs, and vehicle operator input from fusion and control module 330. ADAS analytics module 340 may further receive data from ADAS-operator interface 332, V2X modules 326, camera module 327, navigation subsystem 328, as well as from external devices 325 and/or analytics cloud server 334 via extra-vehicle communication system 324.

ADAS analytics module 340 may comprise an event detector 342 to identify rare and/or surprising events. A surprising event may be defined by surprising event module 344, which may include a surprising event rule set, and may also be stored within the ADAS analytics module 340. Surprising event module 344 may be updated periodically via patches received from analytics cloud server 334. The surprising event module 344 may identify various types of surprises, e.g., sensor inconsistencies that indicate potential sensor problems. The surprising event module may identify issues in hindsight. In other words, sensor problems may be identified after the fact, when the sensor has already failed. Further, surprising event module 344 may identify issues by identifying actions of the vehicle operator that are inconsistent with automated driving outputs of the fusion and control module 330.

Event detector 342 may utilize map data received via navigation subsystem 328 and vehicle-to-vehicle/vehicle-to-infrastructure data received from V2X modules 326 in order to identify rare or surprising events. For example, event detector 342 may utilize map data to calculate a theoretical sensor range and compare object data received from ADAS sensors 305 with V2X information in order to identify onboard sensor issues.

Data received at ADAS analytic module 340 may be stored in event data buffer 346. In some examples, event data buffer 346 may be a first-in, first-out (FIFO) buffer, and may comprise RAM, flash memory, and/or other volatile memory storage. As an example, event data buffer 346 may store the most recent sixty seconds of data received. In some embodiments, event data buffer 346 may comprise first and second buffer segments. As an example, each of the first and second buffer segments may store thirty seconds of data received. When the first buffer segment is filled, data may then be stored in the second buffer segment. When the second buffer segment is filled, the first buffer segment may then be over-written with new data.

Responsive to an indication of a surprising event, data stored in event data buffer 346 from before and/or after the surprising event may be compiled by event data file generator 348. The contents of the event data file may be based on instructions stored in surprise event module 344. The event data file may then be uploaded to analytics cloud server 334 via extra-vehicle communication system 324 for analysis. Additional details pertaining to ADAS analytic module 340 are presented herein and with reference to FIG. 5.

Figure 4:
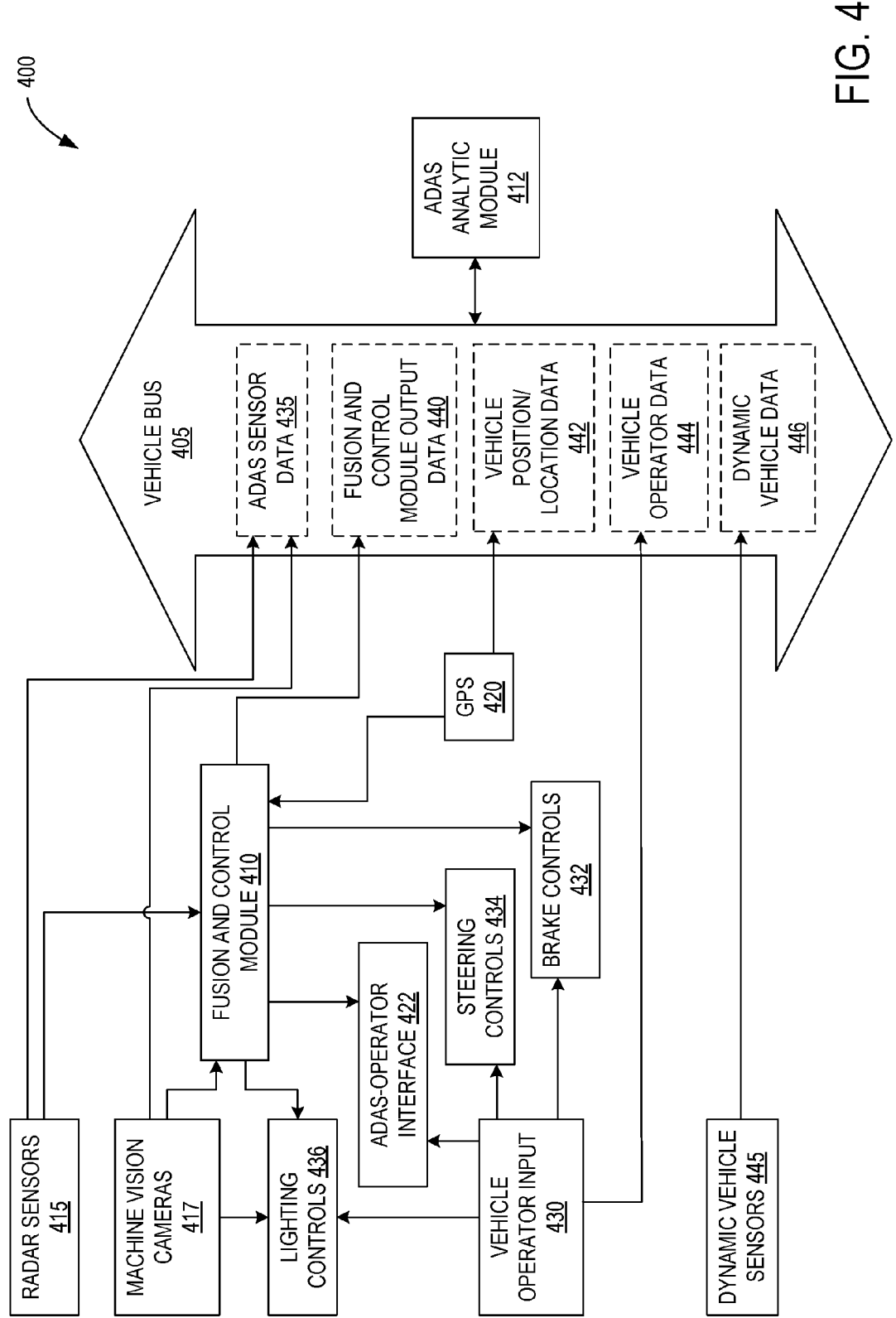
FIG. 4 shows a block diagram of a portion of an example vehicle data network in accordance with one or more embodiments of the present disclosure.

FIG. 4 is a block diagram illustration of a portion of an example vehicle data network 400. Vehicle data network 400 may be an example of intra-vehicle communication system 222 and/or intra-vehicle communication system 314. Vehicle data network 400 may comprise vehicle bus 405. For example, vehicle bus 405 may comprise a controller area network (CAN), automotive Ethernet, Flexray, local interconnect network (LIN), or other suitable network and/or protocol. Vehicle bus 405 may mediate communication and data transfer between various systems and subsystems communicatively coupled to vehicle data network 400.

Vehicle bus 405 may be communicatively coupled to fusion and control module 410 and ADAS analytic module 412. Fusion and control module 410 may be an example of fusion and control module 330 of FIG. 3, while ADAS analytic module 412 may be an example of ADAS analytic module 340 of FIG. 3. Fusion and control module 410 may be communicatively coupled to radar sensors 415 and machine vision cameras 417. Radar sensors 415 and machine vision cameras 417 may be examples of ADAS sensors 305 of FIG. 3.

Radar sensors 415 may be mounted externally to the host vehicle, and may comprise a transmitter configured to emit radio wave pulses, and a receiver (e.g., an antenna) to receive radio wave pulses that have reflected off of objects in the path of the emitted waves. Reflected waves received by radar sensors 415 may be utilized to determine a range, altitude, direction, and/or speed of both moving and fixed objects relative to the host vehicle. Radar sensors 415 may thus be configured to identify and track vehicles, pedestrians, bicyclists and other objects and report those to a fusion and control module 410.

Radar sensors 415 may be selectively placed to detect objects to the front, rear, and/or sides of the vehicle. Objects identified by radar sensors 415 may enable driver assistance in avoiding collisions, parking, adaptive cruise control, lane change events, blind-spot detection, etc. Radar sensors 415 may be configured to identify objects greater than a threshold size (e.g., 5 cm in diameter), and may be further configured to ignore objects smaller than the threshold size. However, in some examples, data pertaining to objects smaller than the threshold size may be aggregated and combined with other sensor data (e.g., for identifying precipitation or fog).

Machine vision cameras 417 may capture images from the environment outside of a vehicle. In some examples, a single machine vision camera may be installed with an aperture directed towards the front of the vehicle. For example a machine vision camera may be situated on a rear view mirror, with an aperture pointing through the windshield. Additional machine vision cameras may be installed to provide images to the rear and sides of the vehicle. 360° views may be generated using 4, 6, 8, or any suitable number of machine vision cameras 417. In some examples, the cameras are in a fixed position, while in other examples, one or more cameras may be configured to swivel or otherwise adjust their position and/or orientation.

Each machine vision camera 417 may comprise a lens assembly, an image sensor positioned to receive images from the lens assembly, and an electronic control unit (ECU). The image sensor may be any suitable type of image sensor, such as, for example a CMOS image sensor. The ECU may contain an identification module that is used to determine selected properties of the environment outside the vehicle based on the image data captured by machine vision camera 417. For example, the selected properties may include the positions of any obstacles, objects, and other vehicles that are in the vicinity of the vehicle, and in particular, in the path of the vehicle. It will be understood however that the selected properties could alternatively be any other suitable selected properties.

Machine vision cameras 417 may be configured to redundantly identify objects and report those to fusion and control module 410. The machine vision camera may also identify lane markings, traffic signs, and characteristics of the road ahead, (e.g., curvature, grade, condition) and may report those to fusion and control module 410. Further, machine vision cameras 417 may be configured to identify environmental characteristics, such as ambient light levels, precipitation, etc.

Fusion and control module 410 may combine information received from radar sensors 415, machine vision cameras 417, as well as data received from GPS 420, and may be configured to determine vehicle control actions in response thereto. GPS 420 may be comprised in a vehicle navigation subsystem, such as navigation subsystems 211 and 328. Fusion and control module 410 may indicate information about the vehicle's path and environment to the vehicle operator via ADAS-operator interface 422.

As an example, an upcoming no-passing zone may be detected, and the vehicle operator may then be alerted. In such an example, machine vision cameras 417 may capture images of two solid yellow line markings on the road may identify that the vehicle is about to enter a no-passing zone. The no-pass zone may also be identified based on road signs (such as "NO-PASSING ZONE" or "PASSING LANE ENDS" signs or signs having graphical representations of a no passing zone, such as a depiction of two cars in parallel with one another and an "x" through one of the cars) posted along the roads, or additionally and/or alternatively identified based on information received via GPS 420. For example, based on a current location of the vehicle, locations of no-passing zones may be identified along a route that the vehicle is travelling. Further, the location and trajectory of other vehicles on the route may be determined based on information from radar sensors 415 and/or machine vision cameras 417. For example, a distance to a nearest vehicle ahead along with the velocity of such a vehicle, distances to the next vehicles in front of the nearest vehicle ahead, locations and velocities of oncoming vehicles in the passing lane, etc. may be determined.

Based on vehicle operator input 430, fusion and control module 410 may determine that the vehicle operator would like to pass the nearest vehicle ahead. This determination may be based on a specific input received via ADAS-operator interface 422, based on operator input during a current trip (e.g., vehicle operator has previously passed vehicles travelling at the same speed as the nearest vehicle ahead), and/or based on other operator input (e.g., vehicle operator activates a turn signal). Fusion and control module 410 may then determine whether there is sufficient time and spacing on the route for the vehicle operator to pass the nearest vehicle ahead. Fusion and control module 410 may then output a message to the vehicle operator via ADAS-operator interface 422, indicating whether a passing action can be performed prior to entering the no-passing zone. For example, ADAS-operator interface 422 may present a text image indicating "OK to pass this car now" or "No-passing zone imminent, next opportunity in 3 miles", and/or may present a graphic image, audible indicator, etc.

In some scenarios, fusion and control module 410 may generate vehicle control actions, and may output instructions to one or more vehicle actuators (such as vehicle actuators 323) to enact the control actions. As non-limiting examples, fusion and control module 410 may be communicatively coupled to brake controls 432, steering controls 434, and lighting controls 436, which may be examples of brake controls 263, steering controls 262, and lighting controls 264, respectively. Fusion and control module 410 may output corresponding information to the vehicle operator via ADAS-operator interface 422 concurrently with, or in advance of outputting vehicle control actions.

As an example, fusion and control module 410 may output instructions to brake controls 432 to initiate emergency braking if data received from radar sensors 415 and/or machine vision cameras 417 indicates the presence of an object ahead and in the path of the host vehicle. In other examples, fusion and control module 410 may output instructions to brake controls 432 to briefly actuate the brakes, such as in a scenario where the host vehicle is operating in cruise control at a first speed, and machine vision cameras 417 detect a sign for a speed limit change to a second speed, less than the first speed.

As another example, fusion and control module 410 may output instructions to steering controls 434 to apply torque to the vehicle steering and adjust the trajectory of the host vehicle. For example, fusion and control module 410 may output instructions to steering controls 434 to increase or decrease the current steering torque responsive to data received from radar sensors 415 and/or machine vision cameras 417 indicating that the host vehicle is approaching a curve at a sub-optimal trajectory. In other scenarios, fusion and control module 410 may output instructions to steering controls 434 to adjust the steering torque responsive to data received from or machine vision cameras 417 indicating that the host vehicle is drifting out of a current lane. Further, fusion and control module 410 may output instructions to steering controls 434 to significantly alter the steering torque responsive to data received from radar sensors 415 and/or machine vision cameras 417 indicating that evasive action is necessary to avoid hitting an object.

Fusion and control module 410 may output instructions to lighting controls 436 to adjust an operating mode of one or more vehicle lights. Additionally or alternatively, machine vision cameras 417 may output instructions to lighting controls 436. For example, front headlights may be instructed to operate in a high beam mode when no preceding or oncoming traffic would be affected by glare, and to switch to a low beam mode in order to avoid glaring other vehicle operators, responsive to data to data received machine vision cameras 417 indicating on-coming traffic. In other scenarios, fusion and control module 410 may output instructions to turn the headlights on and off rapidly in succession responsive to data received from radar sensors 415 and/or machine vision cameras 417 indicating that a nearby vehicle is driving erratically.

Output from radar sensors 415 and machine vision cameras 417 may be routed through vehicle bus 405 tagged as ADAS sensor data 435. Output from fusion and control module 410 may be routed through vehicle bus 405 tagged as fusion and control module output data 440. Similarly, data from GPS 420 may be routed through vehicle bus 405 tagged as vehicle position/location data 442, and actions of the vehicle operator, including vehicle operator input 430, may be routed through vehicle bus 405 tagged as vehicle operator data 444. Data from dynamic vehicle sensors 445 may be routed through vehicle bus 405 tagged as dynamic vehicle data 446. Dynamic vehicle sensors 445 may be an example of sensor subsystem 210 and/or vehicle sensors 320, and may include sensors configured to output data pertaining to vehicle status, vehicle operation, system operation, engine operation, ambient conditions, etc. Data routed through vehicle bus 405 may be selectively directed to ADAS analytic module 412 for analysis.

Fusion and control module 410, in conjunction with radar sensors 415 and machine vision cameras 417, may enable the host vehicle to be operated in one or more automatic vehicle control modes, thus enabling the vehicle operator to shift their focus away from one or more vehicle controls. While operating in an automatic vehicle control mode, instructions for operating one or more vehicle controls, such as steering controls 434, brake controls 432, acceleration controls, gear shifting, and/or other commands may be provided by fusion and control module 410. During the automatic vehicle control mode, vehicle operator input 430 for a given vehicle control system may be ignored, discarded, and/or held for later processing. In this way, the host vehicle may not respond to some or all vehicle operator-initiated commands (e.g., vehicle operator input to one or more driver control devices, such as a steering wheel, gas/accelerator pedal, brake pedal, parking brake, gear shifter, and/or other devices for accepting vehicle-operator input to control operation of the vehicle) during the automatic vehicle control mode.

In some examples, the vehicle-operator may provide an automatic vehicle control override input via ADAS-operator interface 422 that triggers fusion and control system to quickly return at least some controls to the driver. In some examples, the return of the controls may be provided responsive to receiving a threshold number, type, or degree of vehicle operator input during operation under the automatic vehicle control mode, such as a request for braking that exceeds a threshold braking request (e.g., a position of the brake pedal being moved to within a threshold distance of the fully-depressed position). In some examples, some vehicle controls may remain responsive to vehicle operator input even while operating in an automatic vehicle control mode. For example, the vehicle operator may be able to depress a brake pedal to decelerate the vehicle. However, vehicle operator input to other vehicle systems (e.g., turning a steering wheel, depressing an accelerator pedal, moving a gear shift) may be ignored by the vehicle and/or otherwise may not be provided as control commands to the associated vehicle actuators (e.g., an engine, transmission, fuel injector, throttle, etc.). Conversely, during a manual vehicle control mode, all or a majority of the above-described types of vehicle operator input may be provided by the vehicle operator and none or a minority of the above-described vehicle commands may be provided automatically by the vehicle, signals from a leading vehicle, and/or a processor of the vehicle. Different ratios of manual vehicle control to automatic vehicle control may be enabled over multiple automatic vehicle control modes.

Figure 5:
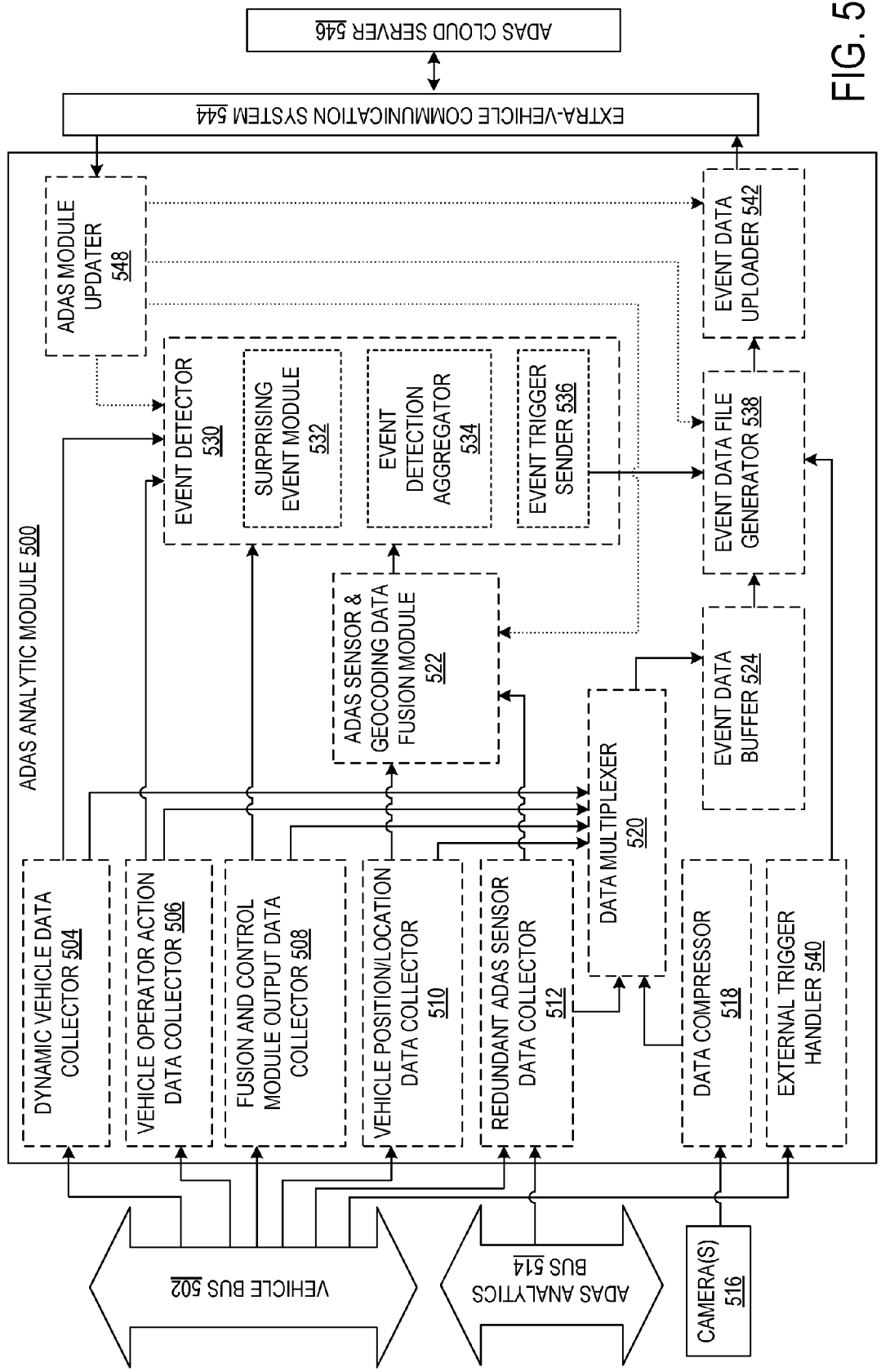
FIG. 5 shows a block diagram of an advanced driver assistance system analytic module in accordance with one or more embodiments of the present disclosure.

FIG. 5 shows a block-diagram for an example ADAS analytic module 500. ADAS analytic module may be an example of ADAS analytic module 340 of FIG. 3 and/or ADAS analytic module 412 of FIG. 4. ADAS analytic module 500 may be communicatively coupled to vehicle bus 502, and may be configured to exchange data, information, and other signals with vehicle bus 502 using a vehicle data network, such as vehicle data network 400 of FIG. 4. Vehicle bus 502 may be an example of vehicle bus 405, and may be configured to facilitate the retrieval and collation of data from vehicle systems, sensors, actuators, etc. as described with regard to FIG. 4. An example method for an ADAS analytic module is presented herein and described with reference to FIG. 7.

ADAS analytic module 500 may include a dynamic vehicle data collector 504, which may be configured to receive data from dynamic vehicle sensors (e.g., dynamic vehicle sensors 445) via vehicle bus 502. Dynamic vehicle sensor data may comprise data pertaining to vehicle system status, such as whether a system (e.g., cruise control, anti-lock brakes, windshield wipers, etc.) is active, and if so, the current operating parameters of the system. Dynamic vehicle sensor data may comprise data pertaining to vehicle parameters, such as vehicle speed, acceleration, trajectory, yaw rate, etc. Dynamic vehicle sensor data may comprise data pertaining to engine parameters, such as engine speed, engine load, commanded air/fuel ratio, manifold adjusted pressure, etc. Dynamic vehicle sensor data may comprise data pertaining to ambient conditions, such as temperature, barometric pressure, etc. Dynamic vehicle sensor data may comprise additional data obtained from vehicle sensors, systems, actuators, etc. as they pertain to ADAS analytics.

ADAS analytic module 500 may include a vehicle operator action data collector 506, which may be configured to receive data pertaining to vehicle operator input (e.g., vehicle operator input 430) via vehicle bus 502. For example, vehicle operator input data may comprise steering torque, steering angle, brake pedal position, accelerator position, gear position, etc.

ADAS analytic module 500 may include a fusion and control module data collector 508, which may be configured to receive data from a fusion and control module (e.g., fusion and control modules 330 and/or 410) via vehicle bus 502. Data received from the fusion and control module may pertain to actions taken by the fusion and control module responsive to data received from vehicle systems and sensors, as described with regards to FIG. 4. For example, corrective actions taken by a fusion and control module, such as vehicle-operator warnings, automatic braking, automatic steering control, evasive actions, etc. Fusion and control module output data collector 508 may also receive and collect data pertaining to driver alertness, collision events, near-collision events, lane deportation, automatic lighting adjustments, and other data output by the fusion and control module of the host vehicle.

ADAS analytic module 500 may include a vehicle position/location data collector 510, which may be configured to receive data from a vehicle GPS and/or other navigation system (e.g., GPS 420, navigation subsystem 328, navigation subsystem 211) via vehicle bus 502. Vehicle position/location data collector 510 may receive and collect data including, but not limited to, GPS derived latitude & longitude, maps of the current vehicle location and surrounding areas, speed limits, road class, weather conditions, and/or other information retrievable through a navigation system.

ADAS analytic module 500 may include a redundant ADAS sensor data collector 512, which may be configured to receive data from ADAS sensors (e.g., ADAS sensors 305 of FIG. 3, radar sensors 415 of FIG. 4, and machine vision cameras 417 of FIG. 4) via ADAS analytics bus 514. Redundant ADAS sensor data collector 512 may receive and collect data output by ADAS sensors, including properties of nearby objects detected by ADAS sensors. In some examples, redundant ADAS sensor data collector 512 may additionally or alternatively receive and collect raw data from ADAS sensors. In examples where the host vehicle comprises multiple radar sensors, machine vision cameras, etc., a primary sensor for each sensor class (e.g., a machine vision camera trained on the environment in front of the host vehicle) may be designated. Output of other sensors within a sensor class may be ignored or discarded, and/or may be selectively collected by redundant ADAS sensor data collector 512 responsive to pre-determined conditions being met.

Data received from one or more cameras 516 may be directed to a data compressor 518 within ADAS analytic module 500. Cameras 516 may be an example of machine visions cameras 417. As described for redundant ADAS sensor data collector 512, data compressor 518 may receive and process data from a primary camera, and/or from each camera coupled to the host vehicle. For example, data compressor 518 may receive and process data from a front camera of a surround view camera system and/or an augmented reality camera mounted so as to have a forward field of view. In examples where the host vehicle comprises a camera module (e.g., camera module 327) configured to receive camera images and/or video from cameras external to the vehicle (e.g., traffic cameras, security cameras), data compressor 518 may additionally or alternatively receive data output by such a camera module. Data compressor 518 may be configured to compress images and/or video output by cameras 516. For example, the resolution of an image may be reduced, the frame rate of a video may be reduced, and/or the data may be stored in a compressed format so as to reduce the storage footprint of the camera data.

Data collected by dynamic vehicle data collector 504, vehicle operator action data collector 506, fusion and control module output data collector 510, and redundant ADAS sensor data collector 512, along with compressed image data generated by data compressor 520 may be output to data multiplexer 520. Data multiplexer 520 may be configured to aggregate data from multiple sources into a single data file or data stream. Data multiplexer 520 may align data received from different sources with regard to time, signal strength, phase, amplitude, etc. In this way, data received from each data source may be standardized for analysis. Further, data multiplexer 520 may discard redundant, irrelevant, or static data that is not pertinent to downstream analysis. In some examples, data multiplexer may derive or infer data by synergizing data received from two or more independent sensors.

Similarly, ADAS sensor and geocoding data fusion module 522 may receive data output by redundant ADAS sensor data collector 512 and vehicle position/location data collector 510. ADAS sensor and geocoding data fusion module 522 may receive a GPS location of the host vehicle along with data regarding objects, roads, terrain, and other characteristics of the host vehicle environment, and may align data received from ADAS sensors with the location and environmental data. Depending on the resolution of the data, ADAS sensor and geocoding data fusion module 522 may provide location stamps to images received from machine vision cameras, may identify and/or align static objects as determined by ADAS sensors with known environmental data, and may retrieve, extract, or generate any additional geocoding data relevant to analysis and reporting of vehicle events.

Multiplexed data may be output from data multiplexer 520 to event data buffer 524. Event data buffer 524 may be an example of event data buffer 346. Briefly, event data buffer 524 may store a predetermined amount of data corresponding to a duration of vehicle operation. For example, event data buffer 524 may store multiplexed data from the most recent 30 seconds of vehicle operation in volatile memory.

Data collected by dynamic vehicle data collector 504, vehicle operator action data collector 506, fusion and control module output data collector 510, along with data received and/or derived at ADAS sensor and geocoding data fusion module 522 may be output to event detector 530. Event detector 530 may be an example of event detector 342, and may comprise surprising event module 532, which may be an example of surprising event module 344. Event detector 530 may further comprise event detection aggregator 534. Event aggregator 534 may translates vehicle-specific data bus signals into generic information. For example, one particular vehicle may choose to transmit vehicle speed in m/s over its vehicle bus, while another transmits vehicle speed in km/h. Event aggregator 534 may thus translate a vehicle-specific vehicle speed signal into a standardized vehicle-speed signal for use in data analysis and reporting.

As described with regard to event detector 342, event detector 530 may analyze input data based on a ruleset stored in surprising event module 532. Surprising event module 532 may comprise instructions, parameters, categories, and rules for identifying a surprising event, for categorizing detected events, for generating an event data file, and for exporting the event data file. Table 2 presents some example surprising events and associated parameters.

TABLE 2

| Type | Condition | Priority | Snapshot | Upload | Note |
|---|---|---|---|---|---|
| Sensor Inconsistency | (Radar object <100 m) && (Vision object == NULL) | 5 | +/−10 sec; front camera 2 fps, BUS | Wifi only | Rare vehicle that didn't fit detection pattern? |
| Sensor Inconsistency | Camera High Beam && V2V oncoming vehicle @ <400 m | 50 | +/−10 sec, front camera 1 fps, BUS | Wi-Fi only | Check for possible lighting control violation |
| Manual Override | Gear == Reverse && Deceleration >0.5 g && Rear Object Detection == NULL | 40 | +/−15 sec, rear camera 15 fps, BUS | Wi-Fi only | Possible weakness in rear object detection? |
| Near Miss | Yaw Rate >10 deg/sec && | 80 | +/−10 sec, all cameras | Wi-Fi and | Fusion and control |

TABLE 2-continued

| Type | Condition | Priority | Snapshot | Upload | Note |
|---|---|---|---|---|---|
| | Deceleration >0.5 g && Fusion == No Object | | 15 fps, BUS | Cellular | module not working? |
| Collision | Airbag Deployment && AEB == NULL | 100 | −30 sec +5 sec Video 30 fps, all cameras BUS | Wi-Fi and Cellular | AEB not working? |
| Hindsight | Target distance at first detection <0.7 * theoretical sensor range derived from map data | 5 | +/−15 sec, rear camera 15 fps, BUS | Wi-Fi only | Possible sensor issue? |
| Known recall | Ignition == off and vehicle speed >20 km/h | 60 | BUS only | Wi-Fi and Cellular | Known industry problem resulting in prior recalls |
| Outsourced component | FFI Lane Departure Warning == Left && Harman Lane Tracking == No Lane | 10 | +/− 10 sec, front camera 15 fps, BUS | Wi-Fi only | Opportunity to benchmark other supplier |

For example, sensor inconsistency may be determined when radar sensors detect an object within 100 meters of the host vehicle, but the machine vision cameras do not detect an equivalent object, or when headlight high-beams remain on despite an approaching vehicle being within 400 meters of the host vehicle.

When a surprising event has been detected by event detector 530, event trigger sender 536 may output an event trigger to event data file generator 538. Event data file generator 538 may be an example of event data file generator 348. Each event trigger may comprise instructions derived from surprising event module 532 as to the nature of data to bundle into an event data file. For example, as shown in Table 2, a manual override event may be indicated responsive to sudden deceleration of the host vehicle when traveling in reverse, and when no object has been detected in the rearward travel path of the host vehicle. In this example, the event data file comprises video (e.g., compressed video) and/or still images derived from a rear-facing camera at a rate of 15 frames per second (fps), as well as data received from the vehicle bus (BUS). Further, the event trigger may comprise instructions indicating a duration prior to the event and/or a duration following the event, from which data should be bundled. In this example, the event trigger for the manual override event indicates that data should be bundled from 15 seconds prior to and 15 seconds following the event. Event data file generator 538 may retrieve the specified data from event data buffer 524, and generate an event data file. The event data file may then be compressed (e.g., as a zip file).

In some examples, event data file generator 538 may receive an event trigger from an external trigger handler 540. External trigger handler 540 may receive an external trigger via vehicle bus 502, which may originate from an in-vehicle computing system or from an external device. For example, an application executing on an in-vehicle computing system may comprise instructions to output an event trigger responsive to predetermined conditions being met. In some examples, a vehicle control system or fusion and control module may directly send an event trigger to external trigger handler 540, in addition to sending data to ADAS analytic module 500 via one or more data collectors. In some scenarios, an external device may output an event trigger. For example, a nearby vehicle may send an event trigger via a V2V module comprising instructions to bundle video data into an event data file to augment or supplement data retrieved by machine vision cameras of the nearby vehicle. External triggers may specify types of vehicle data to be bundled into an event data file as well as durations prior to and following the event from which data should be extracted from event data buffer 524. In some examples, the external trigger may not specify such data parameters, and default data parameters may be used to generate an event data file.

Once generated, event data files may be output to event data uploader 542. Event data uploader 538 may then instruct extra-vehicle communication systems 544 to upload the event data file to analytics cloud server 546. Extra-vehicle communication systems 544 may be an example of extra-vehicle communication systems 334, and may comprise Wi-Fi connectivity, Bluetooth transmission, cellular data networks, or any other suitable wireless communication channel. Analytics cloud server 546 may be an example of analytics cloud server 334. Additional details regarding analytics cloud servers are presented herein and with reference to FIG. 6.

Each event data file may comprise instructions derived from surprising event module 532 which specify how the event data file should be handled by event data uploader 542. For example, each class of surprising events may specify a priority, indicating the relative importance of an event data file. As shown in Table 2, surprising events involving collisions or near-misses of collisions may be assigned higher priority than for surprising events involving modest sensor inconsistencies. The priority assigned to an event data file may indicate an order in which event data files should be handled. For example, if an event data file with an assigned priority of 95 is output to event data uploader 542 while a queue of event data files with assigned priorities between 15 and 30 are awaiting upload to analytics cloud server 546, the event data file with an assigned priority of 95 may bypass the queue and begin to be uploaded immediately. The event data file may also comprise instructions indicating with which of multiple available communication channels the data file should be uploaded. For example, as shown in Table 2, event data files corresponding to sensor inconsistency events may be uploaded via Wi-Fi only, when available. In contrast, higher priority event data files may be uploaded by Wi-Fi and/or cellular networks. Surprising event module 532 may be configured to specify upload channels which minimize data transmission cost in the uploading of lower priority event data files, and to specify upload channels which maximize data transmission speed and reliability in the uploading of higher priority event data files.

As will be described with reference to FIG. 6, analytics cloud server 546 may process, analyze, and aggregate event data files received from multiple ADAS analytic modules installed in different host vehicles. If mitigating action and/or countermeasures are available that would prevent a class of surprising events from occurring in the future, or if the surprising event belongs to a class for which the analytics cloud server has processed a threshold number of event data files, analytics cloud server 546 may issue software and/or firmware updates to adjust the performance of the ADAS. Update patches may be transmitted to ADAS analytic module 500 via extra-vehicle communication system 544, and may be received by ADAS module updater 548. ADAS module updater 548 may parse, process, and apply any such received update patches. Update patches may be applied to one or more software or firmware components of the ADAS. For example, an update patch may be applied to surprising event module 532 indicating new or updated rules, instructions, priorities, classifications, etc. that would cause event detector 530 to adjust the spectrum of events detected, or how to handle such events when detected. Update patches may be applied to ADAS sensor and geocoding data fusion module 522 which improve the accuracy and/or specificity of one or more geocoding algorithms. Update patches may be applied to event data file generator 538 which adjust how an event data file is packaged. Update patches may be applied to event data uploader 542 which adjust how event data files are handled according to their assigned priority.

In some examples, update patches may be applied to a fusion and control module, such as fusion and control modules 330 and 410. Such an update may adjust how data is processed at the fusion and control module, and/or may adjust the content of control routines output by the module. For example, an update patch may indicate reduced reliability of a radar sensor or machine vision camera in a certain geographical area or under certain driving conditions, and thus data received in such a scenario is given lower weight as compared to more reliable sensors. Further, firmware update patches may be applied to ADAS sensors, such as the radar sensors and machine vision cameras to improve the performance thereof, including adjusting object detection parameters.

Figure 6:
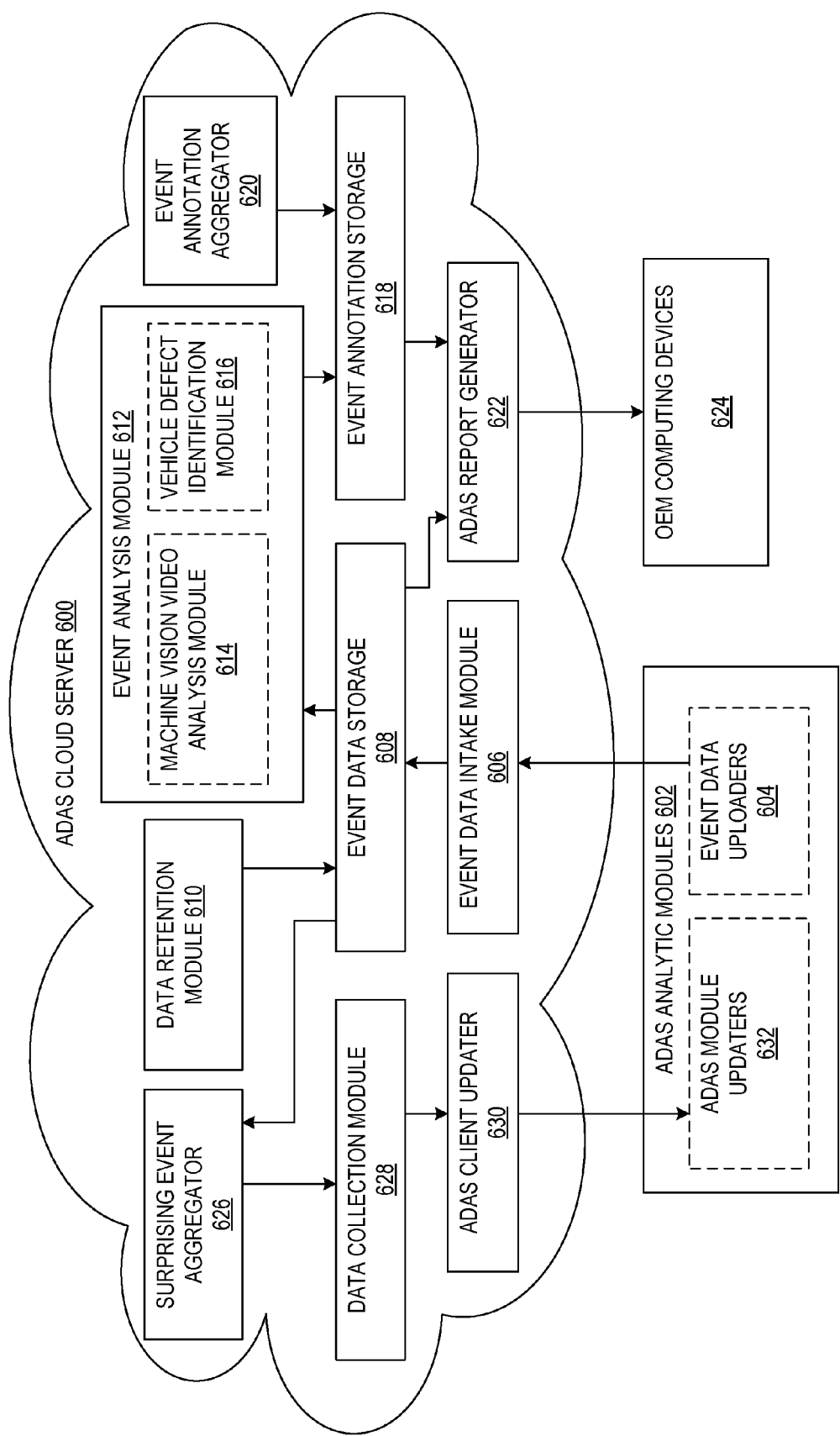
FIG. 6 shows a block diagram of an advanced driver assistance system cloud server in accordance with one or more embodiments of the present disclosure.

FIG. 6 shows a block diagram of an advanced driver assistance system cloud server 600. Analytics cloud server 600 may be an example of analytics cloud servers 334 and/or 546. As described with reference to FIG. 5, analytics cloud server 600 may receive event data files from a plurality of ADAS analytic modules 602 via event data uploaders 604. ADAS analytic modules 602 may be examples of ADAS analytic modules 340, 412, and/or 500, while event data uploaders 604 may be examples of event data uploader 542. An event data uploader 604 may provide event data files to analytics cloud server over any suitable extra-vehicle communication system. In some examples, user-specific information may only be transmitted if the user provides approval and/or if the information is encrypted and able to be sent over a communication link having a particular level of security.

Analytics cloud server 600 may include one or more modules for receiving, processing, and outputting data to and/or from the devices and services connected to the server(s). For example, an event data intake module 606 may receive event data files from event data uploaders 604. Event data intake module 606 may unpackage (e.g., decompress) compressed files, validate the data contained within the event data file, and assign the event data to one or more data clusters. For example, the event data may be assigned to data clusters based on a type, class, and/or category of surprising event, based on vehicle type, ADAS analytic module type, sensor type, etc. Event data may be assigned to existing data clusters and/or new data clusters. Event data intake module 606 may then output the event data to event data storage 608, where event data may be stored based on the clusters assigned by event data intake module 606.

Storage of event data may be governed by data retention instructions included in data retention module 610. For example, data retention module 610 may determine whether a given cluster has a threshold amount of event data. For example, data retention module 610 may indicate that enough event data files have been assigned to a given data cluster to resolve a class of surprising events, and thus the data may not be stored at event data storage 608. In some examples, the cluster assignment(s) for an incoming event data file may trigger re-clustering of event data that has previously been stored at event data storage 608, and/or may trigger the assigning of new clusters to previously stored event data. Data retention module 610 may indicate how event data is to be aggregated, combined, and organized, so that event data received from multiple ADAS analytic modules 602 may be used by other modules within analytics cloud server 600.

Event data stored at event data storage 608 may be accessed by event analysis module 612. Event analysis module may analyze event data files individually and/or as part of a cluster. Event analysis module 612 may utilize learning algorithms to combine historical data with currently-received data in order to determine behaviors and/or relationships between data. The learning algorithms may utilize information from multiple devices/users and/or information specific to a particular device/user in order to determine the cause of a surprising event. Estimation modules may utilize aggregated information from the different devices/services, as well as input from historical data and/or learning algorithms, in order to determine estimations of non-discrete data, which may not be directly provided to analytics cloud server 600 by ADAS analytic modules 602. Event analysis module 612 may utilize manual and automatic review processes and utilize algorithms that are more computationally intensive than what could be calculated by an ADAS analytic module, a fusion and control module, or an ADAS sensor. Further, event analysis module 612 may employ analysis algorithms and techniques that were not available at the time the ADAS sensors and modules were developed.

Event analysis module 612 may include machine vision video analysis module 614, which may parse data received from machine vision cameras, including data that has been processed by an ADAS sensor and geocoding data fusion module. Further, machine vision video analysis module 614 may retrieve additional vehicle position and location data which may not have been available to the ADAS analytic module which generated the original event data file. Machine vision video analysis module 614 may analyze each frame of video received, identify objects in each frame of video, and compare the identified objects to objects originally identified by the machine vision cameras. For event data clusters, machine vision video analysis module 614 may compare identified objects in video frames across data from similar surprising events, and may determine whether there are shared characteristics among objects, machine vision cameras, and/or object identification modules which may explain why objects were misclassified and/or escaped identification.

Event analysis module 612 may further include vehicle defect identification module 616. Vehicle defect identification module 616 may analyze event data files to determine whether a common vehicle defect exists, and whether countermeasures exist that could be applied to correct and/or lessen the impact of identified defects. Vehicle defects may be mechanical, software based, and/or firmware based.

Identified vehicle defects and event data characteristics may be output to event annotation storage 618, along with data collected by event annotation aggregator 620. Event annotation aggregator 620 may retrieve additional data which is pertinent to a surprising event, either from event data storage 608 or from external data sources. For example, event annotation aggregator 620 may retrieve weather data for the time and location of the surprising event, relevant traffic data, vehicle specifications, user driving records, etc.

Event annotations, identified defects, and event data characteristics may be accessed by ADAS report generator 622, which may bundle such information together in order to communicate the results of event analysis to relevant parties in order to guide future developments and improvements in ADAS sensors and modules. For example, An ADAS report may be output from ADAS report generator 622 to OEM computing devices 624. OEM computing devices 624 may comprise data servers, services, and/or modules operated by sensor manufacturers, vehicle component manufacturers, software developers, etc. In some embodiments, OEM computing devices 624 are examples of external services 246 and/or external devices 325.

Analytics cloud server 600 may further include surprising event aggregator 626. Surprising event aggregator 626 may access event data storage 608, and determine whether current rule sets applied by surprising event modules, such as surprising event module 532, should be adjusted. For example, surprising event rulesets may be adjusted to prevent collection of data from surprising events which have been resolved, and to increase collection of data related to newly identified surprising events. Changes in surprising event rules may be output to data collection module 628. Data collection module 628 may store data collection rulesets, as well as any countermeasures that have been determined through event analysis at analytics cloud server 600. ADAS client updater 630 may access the rulesets and countermeasures stored in data collection module 628, and may generate ADAS update patches that may be output to ADAS module updaters 632, which may be examples of ADAS module updater 548.

As described with reference to FIG. 5, ADAS update patches may be applied to various ADAS sensors and modules. When applies, the ADAS update patches may improve sensor performance, adjust event data collection, and/or adjust how sensor data is analyzed at the host vehicle. Update patches may be output to a single ADAS analytic module 602, or to a plurality of ADAS analytic modules which have one or more similar characteristics, such as host vehicle type, ADAS sensor type, ADAS analytic module version, vehicle region of operation, etc. Table 3 presents example patch data that may be issued by ADAS client updater 630.

TABLE 3

| Type | Condition | Patch | Note |
| --- | --- | --- | --- |
| sensor weakness | GPS = 40.6175482, −75.3580523 +− 50 m | RadarReliability = Reduced | Bridge has been mistaken for vehicle |
| sensor weakness | GPS = −33.7329889, 19.1152777 +− 50 m | CameraReliability = Reduced | Tunnel entrance has been mistaken for truck |
| accident experience | GPS = 50.8064942, −0.5865503 +− 100 m && Day == (Sat or Sun) && OutsideTemp >20° C. | Display Warning = "Known accident spot ahead. Watch for bikers". | |

Figure 7:
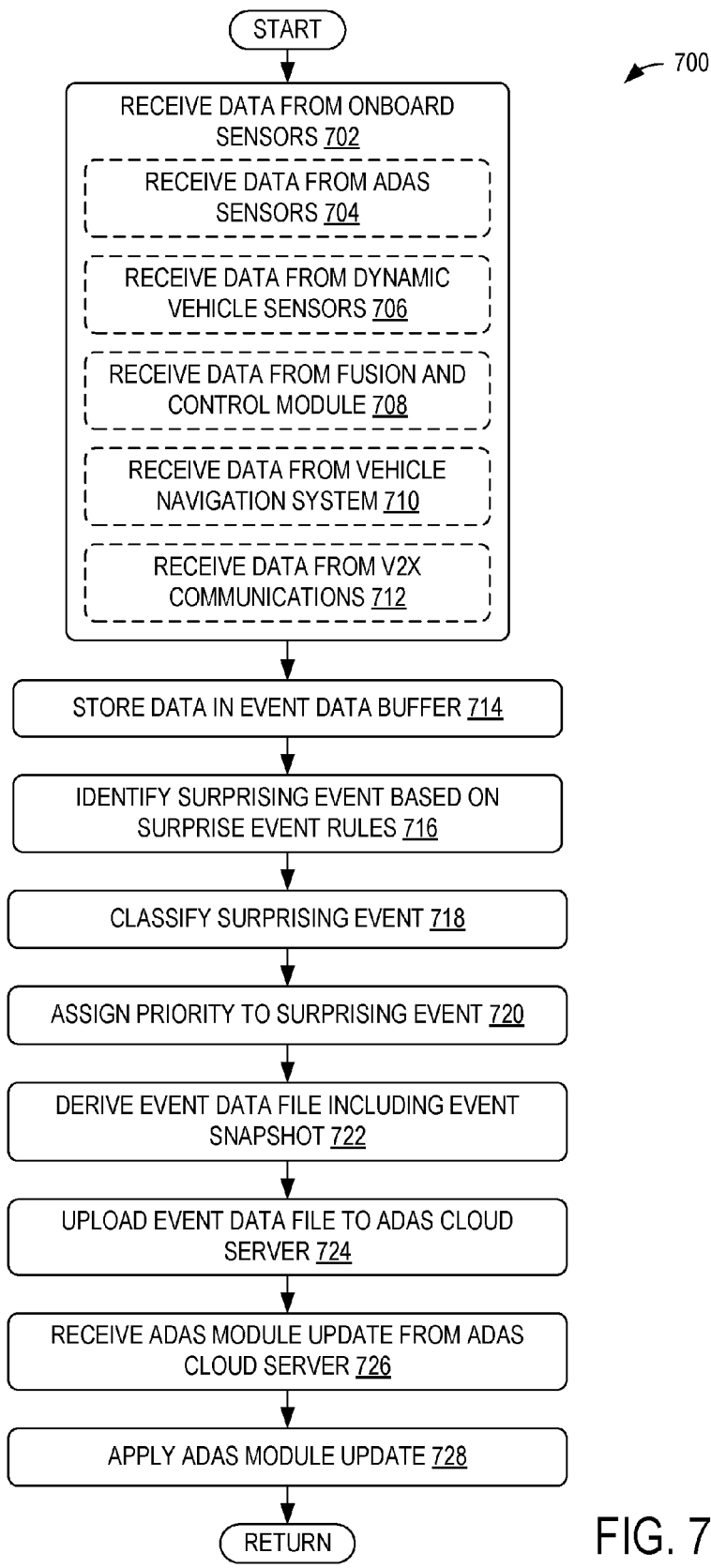
FIG. 7 is a flow chart of an example method for identifying and mitigating surprising events in accordance with one or more embodiments of the present disclosure.

FIG. 7 is a flow chart of an example method 700 for identifying and mitigating surprising events. Specifically, method 700 may be implemented by an ADAS analytic module, such as ADAS analytic modules 340, 412, and 500. Method 700 will be described with reference to FIG. 5 and ADAS analytic module 500, but it should be understood that similar methods may be implemented by other systems without departing from the scope of this disclosure.

Method 700 begins at 702, and includes receiving data from onboard sensors. Receiving data from onboard sensors may include receiving data at one or more data collectors from a vehicle bus, such as vehicle bus 502, an ADAS analytics bus, such as ADAS analytics bus 514, and/or directly from an onboard sensor. In some examples, method 700 proceeds to 704 and includes receiving data from ADAS sensors. For example, data from radar sensors and machine vision cameras may be received at a redundant ADAS sensor data collector, such as redundant ADAS sensor data collector 512. Further, data from machine vision cameras may be received at a data compressor, such as data compressor 518. In some examples, method 700 proceeds to 706 and includes receiving data from dynamic vehicle sensors. For example, data from vehicle sensors may be received at a dynamic vehicle data collector, such dynamic vehicle data collector 504. In some examples, method 700 proceeds to 708 and includes receiving data from a fusion and control module. For example, output of a fusion and control module, such as vehicle control actions, may be received at a fusion and control module output data collector, such as fusion and control module output data collector 508. In some examples, method 700 proceeds to 710 and includes receiving data from a vehicle navigation system. For example, data from an on-board GPS may be received at a vehicle position/location data collector, such as vehicle position/location data collector 510. In some examples, method 700 proceeds to 712 and includes receiving data from V2X communications. For example, data vehicle-to-vehicle and vehicle-to-infrastructure modules may be received at the ADAS analytic module. Receiving data from on-board data sensors may further include receiving data pertaining to vehicle operator actions.

Continuing at 714, method 700 includes storing received data in an event data buffer. Received data may be parsed, validated, annotated, standardized, and multiplexed, and then stored in a running buffer, such as event data buffer 524. Older data may be over-written by newer data, while maintaining data from a duration prior to the current time point, such that data may be extracted from a duration prior to any detected surprising event.

Continuing at 716, method 700 includes identifying a surprising event based on surprising event rules. For example, an event detector, such as event detector 530 may analyze incoming data from onboard sensors based on rulesets stored in a surprising event module, such as surprising event module 532. Surprising event rules may indicate conflicting data received (or not received) from two or more onboard sensors. When a surprising event has been identified, method 700 proceeds to 718, and includes classifying the surprising event. Classifications for a surprising event may be retrieved from a surprising event module, and may indicate the nature of the surprising event so that data from the surprising event maybe combined with data from similar surprising events. For example, the surprising event may be classified as a sensor inconsistency, a sensor malfunction, an unanticipated vehicle action, an unanticipated vehicle-operator action, etc.

Continuing at 720, method 700 includes assigning a priority to the surprising event. Priority for a surprising event may be retrieved from a surprising event module, and may indicate an urgency with which the surprising event should be processed and uploaded. For example, surprising events which result in a vehicle collision or near-collision may be assigned a priority greater than for surprising events which merely indicate a sensor inconsistency.

Continuing at 722, method 700 includes deriving an event data file including an event snapshot. The contents of the event data file may be specified in the surprise event module, including which data to package in to the event data file, and a duration prior to and/or following the surprising event from which to collate data. Data may be retrieved from the event data buffer, and may be bundled into a compressed file format by an event data file generator, such as event data file generator 538.

Continuing at 724, method 700 includes uploading the event data file to an analytics cloud server. Uploading of the event data file may be handled by an event data uploader, such as event data uploader 542 of FIG. 5. Event data uploader 542 may utilize an extra-vehicle communication system to connect with the analytics cloud server via one or more data transfer networks. The identity of preferred data transfer networks may be retrieved from the surprising event module. Higher priority events may transferred over immediately available networks, while lower priority events may be maintained in an upload queue until a low cost network (e.g., WIFI) becomes available.

Continuing at 726, method 700 includes receiving an ADAS module update from the analytics cloud server. An ADAS module update (or update patch) may be transmitted to an ADAS analytic module via one or more networks of an extra-vehicle communication system, and may be received by an ADAS module updater, such as ADAS module updater 548. An ADAS module update may be issued to one or more ADAS analytic modules, responsive to countermeasures being developed at an analytics cloud server.

Continuing at 728, method 700 includes applying the ADAS module update received from the analytics cloud server. An ADAS module updater may parse, process, and apply any such received update patches. Update patches may be applied to one or more software or firmware components of the ADAS, including ADAS sensors, ADAS analytic modules, data processing modules, rulesets for event detection, event data file generation, event data file uploading modules, etc. Method 700 may then return to 702, whereby the described method steps may be performed using the updated software and/or firmware.

Figure 8:
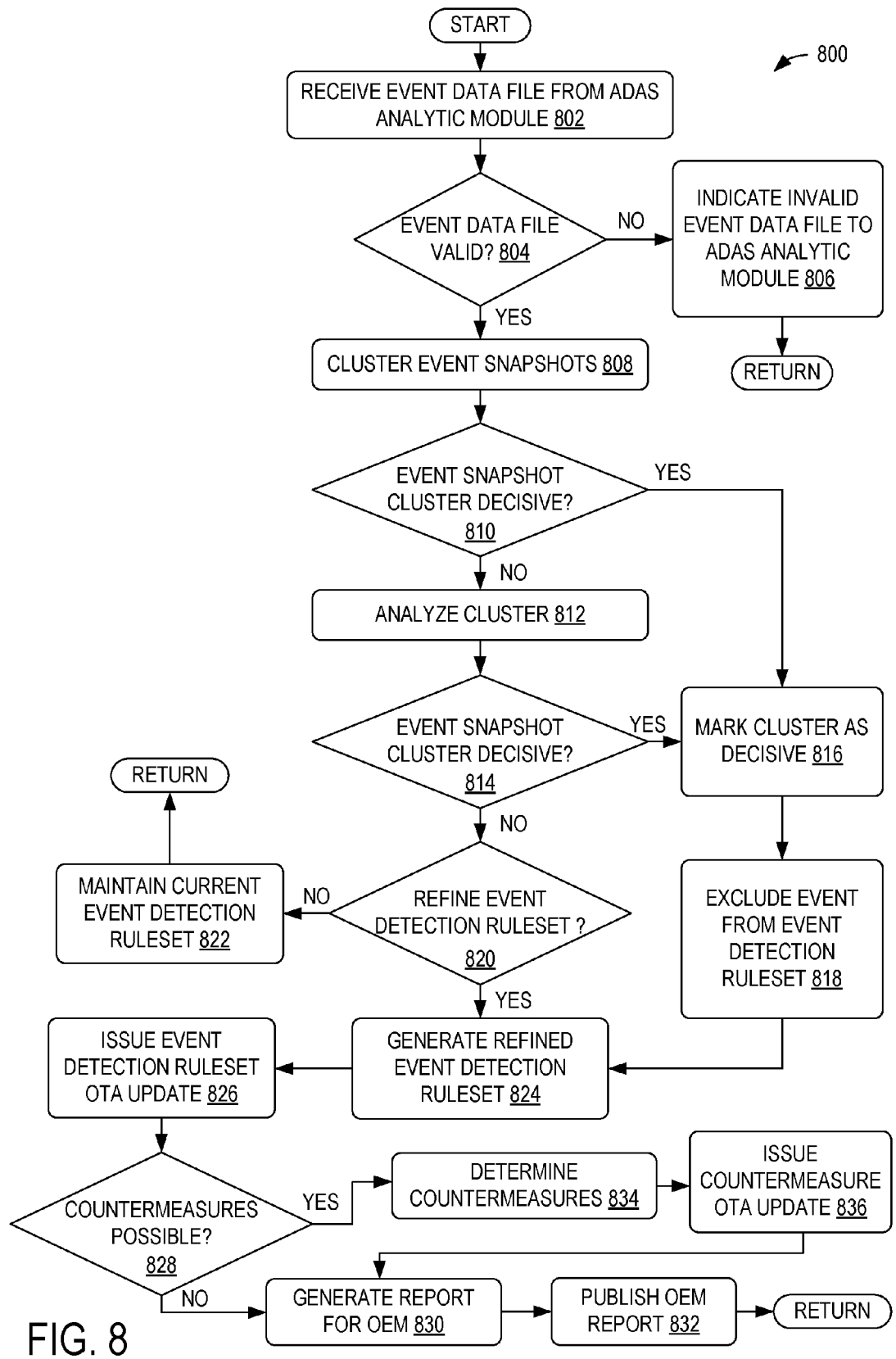
FIG. 8 is a flow chart of an example method for analyzing and generating countermeasures to surprising events in accordance with one or more embodiments of the present disclosure.

FIG. 8 is a flow chart of an example method 800 for analyzing and generating countermeasures to surprising events. Specifically, method 800 may be implemented by an analytics cloud server, such as analytics cloud servers 334, 546, and 600 of FIGS. 3, 5, and 6, respectively. Method 800 will be described with reference to FIG. 6 and analytics cloud server 600, but it should be understood that similar methods may be implemented by other systems without departing from the scope of this disclosure.

Method 800 begins at 802, and includes receiving an event data file from an ADAS analytic module. For example, an event data intake module, such as event data intake module 606, may receive event data files from event data uploaders via one or more data transfer networks.

Continuing at 604, method 800 includes determining whether the received event data file is valid. The event data intake module may unpackage compressed files, and determine whether the event data file is complete, if the data is correct from a syntactic perspective, whether encrypted data is accessible, etc. If the event data file is not valid, method 800 proceeds to 806, and includes indicating the invalid event date file to the ADAS analytic module that uploaded the file. The indication may be distributed over the same data network that handled the event data file upload, or any other suitable data transfer or messaging network.

If the event data file is validated, method 800 proceeds to 806, and includes clustering event snapshots. Each event data file may include an event snapshot providing sensor data and other information regarding the nature of the surprising event which predicated the event data file. For example, the event data may be assigned to data clusters based on a type, class, and/or category of surprising event, based on vehicle type, ADAS analytic module type, sensor type, etc. Event data may be assigned to existing data clusters and/or new data clusters.

At 810, method 800 includes determining whether the updated event snapshot cluster is decisive. In other words, it will be determined whether the cluster comprises enough event snapshots to yield significant analysis results, or whether a countermeasure has previously been developed which addresses a known cause of the surprising event. If the cluster is not decisive, method 800 proceeds to 812, and includes analyzing the event snapshot cluster. For example, an event analysis module, such as event analysis module 612, may analyze event data snapshots individually and/or as a cluster. The event analysis module may utilize learning algorithms to combine historical data with currently-received data in order to determine behaviors and/or relationships between data. The learning algorithms may utilize information from multiple devices/users and/or information specific to a particular device/user in order to determine the cause of a surprising event. Estimation modules may utilize aggregated information from the different devices/services, as well as input from historical data and/or learning algorithms, in order to determine estimations of non-discrete data.

Both manual and automatic review processes may be used in reviewing data received from machine vision cameras. For example, a surprising event cluster where machine vision cameras did not recognize an object that was identified by other sensors may be targeted for manual review. Automatic review processes may include analyze each frame of video received, identifying objects in each frame of video, and comparing the identified objects to objects originally identified by the machine vision cameras. For event data clusters, machine vision video analysis may compare identified objects in video frames across data from similar surprising events, and may determine whether there are shared characteristics among objects, machine vision cameras, and/or object identification modules which may explain why objects were misclassified and/or escaped identification.

Continuing at 814, method 800 includes determining whether the cluster analysis provided a decisive result. When an event snapshot cluster has been deemed decisive, either prior to, or following cluster analysis, method 800 proceeds to 816 and includes marking the cluster as decisive. Continuing at 818, method 800 includes excluding similar events from an event detection ruleset. In this way, redundant data can be prevented from further uploading to the analytics cloud server.

If, following cluster analysis, the event snapshot is still not decisive, method 800 proceeds to 820, and includes determining whether the event detection ruleset should be refined. For example, an event detection ruleset may be refined to generate more event data files pertaining to a type of surprising event, to prevent the generation redundant data files, and/or to refine rulesets for similar surprising events so they be analyzed in tandem. If no event detection ruleset refinement is indicated, method 800 proceeds to 822, and includes maintaining current event detection rulesets.

If an event detection rulesets are to be refined, and/or if events are being excluded from an event detection ruleset, method 800 proceeds to 824, and includes generating a refined event detection ruleset. Continuing at 826, method 800 includes issuing an event detection ruleset OTA update. The event detection ruleset OTA update may be issued to a plurality of ADAS analytic modules via a client updater, such as ADAS client updater 630. As described with reference to FIGS. 5 and 7, ruleset update patches may be applied to a surprising event module.

Continuing at 828, method 800 includes determining whether countermeasures are possible, such as software or firmware updates that may address a root cause of a surprising event. If no countermeasures are possible, method 800 proceeds to 830, and includes generating a report for one or more OEMs. The OEM report may indicate the results of cluster analysis, ruleset changes, etc. Continuing at 832, method 800 includes publishing the OEM report, which may include conveying the report to one or more OEM computing devices and/or servers via a communication network. OEM computing devices may comprise data servers, services, and/or modules operated by sensor manufacturers, vehicle component manufacturers, software developers, etc.

If countermeasures are possible, method 800 proceeds to 834, and includes determining countermeasures that could be applied to correct and/or lessen the impact of identified defects. Vehicle defects may be mechanical, software based, and/or firmware based. Continuing at 836, method 800 includes issuing a countermeasure OTA update. A countermeasure OTA update may be issued to a plurality of ADAS analytic modules via a client updater, such as ADAS client updater 630. As described with reference to FIGS. 5 and 7, software and firmware updates may be applied to various ADAS system components, including sensors, analysis modules, data collection modules, etc. Countermeasure OTA updates may be issued concurrently with event detection ruleset OTA updates. Method 800 then proceeds to 830, and includes generating a report for one or more OEMs. The OEM report may indicate the countermeasures that were issued. Continuing at 832, method 800 includes publishing the OEM report.

The above-described systems and methods also provide for a surprising event detection system for a vehicle having a driver assistance system that controls lateral and/or longitudinal movement of the vehicle, the surprising event detection system including an event detector comprising a set of rules defining a surprising event based on a combination of at least two input signals, an event data file generator configured to generate an event data file including a video signal received from a camera, a signal from at least one dynamic vehicle sensor, and object information received from an object detection sensor, wherein the event data file generator is further configured to initiate event data file generation responsive to a surprising event being detected by the event generator. In a first example of the system, the combination of at least two input signals additionally or alternatively includes at least one signal reflecting a vehicle operator input and at least one signal from the object detection sensor, and the driver assistance system additionally or alternatively includes an automatic emergency braking mechanism. A second example of the system optionally includes the first example, and further includes the system, wherein the combination of at least two input signals comprises at least one signal received over an extra-vehicle communication system from a second vehicle. A third example of the system optionally includes one or both of the first example and the second example, and further includes the system, wherein the combination of at least two input signals are transmitted on a vehicle data bus and are selected from the group consisting of a vehicle speed signal, a vehicle yaw rate signal, a steering wheel angle signal, a vehicle brake pedal position signal, a vehicle accelerator pedal position signal, a preceding vehicle distance signal, a preceding vehicle relative velocity signal, a turn indicator signal, a steering torque request signal, a vehicle acceleration request signal, and an airbag deployment signal. A fourth example of the system optionally includes one or more of the first through the third examples, and further includes the system, wherein the combination of at least two input signals comprises at least one signal from the object detection sensor and at least one signal from a second object detection sensor. A fifth example of the system optionally includes one or more of the first through the fourth examples, and further includes the system, further including a video compressor, wherein the video signal in the event data file has been compressed by the video compressor. A sixth example of the system optionally includes one or more of the first through the fifth examples, and further includes the system, wherein the combination of at least two input signals includes at least one signals selected from the group consisting of a steering wheel angle signal, a vehicle brake pedal position signal, and a vehicle accelerator pedal position signal, and at least one signal selected from the group consisting of a steering torque request, a steering angle request, and an acceleration request. A seventh example of the system optionally includes one or more of the first through the sixth examples, and further includes the system, wherein the rules defining the surprising event are associated with rules defining the event data file, and wherein the rules defining the event data file comprise at least one of: a length of time to be recorded before detection of the surprising event, a length of time to be recorded after detection of the surprising event, a frame rate of video to be recorded, and an identification of signals to be recorded. An eighth example of the system optionally includes one or more of the first through the seventh examples, and further includes the system, further including a rolling event data buffer which receives signals from a vehicle data bus, wherein the event data file comprises data present in the rolling event data buffer at the time of detecting a surprising event and data received by the surprising event detection system after the time of the surprising event. A ninth example of the system optionally includes one or more of the first through the eighth examples, and further includes the system, further including an event data uploader configured to upload an event data file to the server based on the set of rules comprised in the event detector. A tenth example of the system optionally includes one or more of the first through the ninth examples, and further includes the system, wherein the rules comprised in the event detector indicate a priority for the detected surprising event. An eleventh example of the system optionally includes one or more of the first through the tenth examples, and further includes the system, wherein the rules comprised in the event detector indicate a preferred data transfer network for uploading the event data file to the driver assistance server. A twelfth example of the system optionally includes one or more of the first through the eleventh examples, and further includes the system, wherein the object detection sensor is a radar sensor, a lidar sensor, or a machine vision camera. A thirteenth example of the system optionally includes one or more of the first through the twelfth examples, and further includes the system, wherein the event data file is asymmetrically encrypted with the public key of a designed recipient. A fourteenth example of the system optionally includes one or more of the first through the thirteenth examples, and further includes the system, further including a driver assistance module updater configured to receive an update patch from the server, and to apply the update patch to the surprising event detection system, and wherein the update patch comprises updated rules defining a surprising event to be stored at the event detector.

The systems and methods described above also provide for a method for detecting surprising events in a vehicle having a driver assistance system that controls lateral and/or longitudinal movement of the vehicle, the method including receiving signal data from one or more onboard vehicle sensors and one or more object identification sensors, receiving video data from one or more video cameras, storing the signal data and the video data in an event data buffer, identifying a surprising event from the received signal data based on surprise event rules stored at an event detector, deriving an event data file for the surprising event based on the surprise event rules, uploading the event data file to a server, receiving an update module from the server, comprising updated surprise event rules, and applying the update module to change the surprise event rules. In a first example of the method, receiving signal data from one or more onboard vehicle sensors and one or more object identification sensors may additionally or alternatively further include at least one of: receiving data from an on-board radar sensor, receiving data from an on-board machine vision camera, receiving data from a dynamic vehicle sensor, receiving data from a vehicle navigation system, receiving data from a vehicle-to-vehicle communication module, and receiving data from a fusion and control module configured to adjust a parameter of one or more vehicle actuators responsive to signals received from the object identification sensors. A second example of the method optionally includes the first example, and further includes the method, wherein receiving video data from one or more video cameras comprises at least one of: receiving video from a forward facing camera mounted to windshield, receiving video from a forward facing camera mounted near the front of the vehicle, receiving video data from a rearward facing side mirror replacement camera, and receiving video from a rearward facing camera mounted near the rear of the vehicle. A third example of the method optionally includes one or both of the first example and the second example, and further includes the method, further including the steps of executing, on the server, a machine vision algorithm to video data contained within the event data file, and associating annotation information with the event data file. A fourth example of the method optionally includes one or more of the first through the third examples, and further includes the method, wherein the surprise event rules are selected to cause, on average, no more than one event per week to be uploaded to the server.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 described with reference to FIG. 1 and/or in-vehicle computing system 200 described with reference to FIG. 2, in combination with advanced driver assistance system 300 described with reference to FIG. 3, and/or advanced driver assistance system cloud server 600 described with reference to FIG. 6. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A surprising event detection system for a vehicle having a driver assistance system that controls lateral and/or longitudinal movement of the vehicle, the surprising event detection system comprising:
   an interface communicatively connected to a camera, at least one dynamic vehicle sensor, and an object detection sensor;
   a processor; and
   one or more storage devices that store a set of rules defining a surprising event based on a combination of at least two input signals and that further store instructions executable by the processor to:
generate, with an event data file generator responsive to a surprising event being detected, an event data file comprising:
a video signal received from the camera;
a signal from the at least one dynamic vehicle sensor; and
object information received from the object detection sensor,
periodically export event data to an analytic server, and
receive an update patch from an update server and apply the update patch to the surprising event detection system, wherein the update patch comprises updated rules adjusting a spectrum of surprising events to be stored and adjusting a handling of a detection of each surprising event of the spectrum of surprising events, the adjusting of the handling of the detection of each surprising event including adjusting a weight of data received from a selected sensor responding to an indication of a change in reliability of the selected sensor.

2. The surprising event detection system as in claim 1, wherein the combination of at least two input signals comprises at least one signal reflecting a vehicle operator input and at least one signal from the object detection sensor, and wherein the driver assistance system includes an automatic emergency braking mechanism.

3. The surprising event detection system as in claim 1, wherein the combination of at least two input signals comprises at least one signal received over an extra-vehicle communication system from a second vehicle.

4. The surprising event detection system as in claim 1, wherein the combination of at least two input signals is transmitted on a vehicle data bus and is selected from the group consisting of a vehicle speed signal, a vehicle yaw rate signal, a steering wheel angle signal, a vehicle brake pedal position signal, a vehicle accelerator pedal position signal, a preceding vehicle distance signal, a preceding vehicle relative velocity signal, a turn indicator signal, a steering torque request signal, a vehicle acceleration request signal, and an airbag deployment signal.

5. The surprising event detection system as in claim 1, wherein the combination of at least two input signals comprises at least one signal from the object detection sensor and at least one signal from a second object detection sensor.

6. The surprising event detection system as in claim 1, further comprising a video compressor, wherein the video signal in the event data file has been compressed by the video compressor.

7. The surprising event detection system as in claim 1, wherein the combination of at least two input signals comprises:
at least one signal selected from the group consisting of a steering wheel angle signal, a vehicle brake pedal position signal, and a vehicle accelerator pedal position signal; and
at least one signal selected from the group consisting of a steering torque request, a steering angle request, and an acceleration request.

8. The surprising event detection system as in claim 1, wherein the set of rules defining the surprising event is associated with rules defining the event data file, and wherein the rules defining the event data file comprise:
a length of time to be recorded before detection of the surprising event,
a length of time to be recorded after detection of the surprising event,
a frame rate of video to be recorded, and/or
an identification of signals to be recorded.

9. The surprising event detection system as in claim 1, further comprising a rolling event data buffer which receives signals from a vehicle data bus,
wherein the event data file comprises data present in the rolling event data buffer at a time of detecting the surprising event and data received by the surprising event detection system after the time of detecting the surprising event.

10. The surprising event detection system of claim 1, wherein the instructions are further executable to upload the event data file to the analytic server based on the set of rules, wherein the set of rules comprises an indication of a priority for the detected surprising event and/or a selected data transfer network for uploading the event data file to the analytic server.

11. The surprising event detection system of claim 1, wherein the object detection sensor is a radar sensor, a lidar sensor, or a machine vision camera.

12. The surprising event detection system of claim 1, wherein the event data file is asymmetrically encrypted with a public key of a designated recipient.

13. A method for detecting surprising events in a vehicle having a driver assistance system that controls lateral and/or longitudinal movement of the vehicle, the method comprising:
receiving signal data from one or more onboard vehicle sensors and one or more object identification sensors;
receiving video data from one or more video cameras;
storing the signal data and the video data in an event data buffer;
identifying a surprising event from the received signal data based on surprise event rules stored at a storage device;
deriving an event data file for the surprising event based on the surprise event rules;
uploading the event data file to a server;
receiving an update patch from the server, comprising updated surprise event rules; and
applying the update patch to adjust a packaging of event data files, to change the surprise event rules by adjusting a spectrum of events detected, and to adjust a handling of event data files according to associated assigned priorities by adjusting a weight of data received from a selected sensor responsive to an indication of a change in reliability of the selected sensor.

14. The method of claim 13, wherein receiving the signal data from the one or more onboard vehicle sensors and the one or more object identification sensors further comprises:
receiving data from an on-board radar sensor;
receiving data from an on-board machine vision camera;
receiving data from a dynamic vehicle sensor;
receiving data from a vehicle navigation system;
receiving data from another vehicle; and/or
receiving data indicating an adjustment of a parameter of one or more vehicle actuators to be made responsive to signals received from the object identification sensors.

15. The method of claim 13, wherein receiving the video data from the one or more video cameras comprises:
receiving video from a forward facing camera mounted to a windshield;
receiving video from a forward facing camera mounted near a front of the vehicle;

receiving video data from a rearward facing side mirror replacement camera; and/or receiving video from a rearward facing camera mounted near a rear of the vehicle.

16. The method of claim 13, further comprising:

executing, on the server, a machine vision algorithm to determine the surprising event using the video data contained within the event data file; and associating annotation information with the event data file.

17. The method of claim 13, wherein the surprise event rules are selected to cause, on average, no more than one event per week to be uploaded to the server.

18. A method for detecting surprising events in a vehicle having a driver assistance system that controls lateral and/or longitudinal movement of the vehicle, the method comprising:

receiving signal data from one or more onboard vehicle sensors and one or more object identification sensors;

receiving video data from one or more video cameras;

storing the signal data and the video data in an event data buffer;

identifying a surprising event from the received signal data based on surprise event rules stored at a storage device;

deriving an event data file for the surprising event based on the surprise event rules;

uploading the event data file to a server;

receiving an update patch from the server, comprising updated surprise event rules; and applying the update patch to change a weight that is assigned to data received from a selected sensor responsive to an indication of a change in reliability of the selected sensor.

19. The method of claim 18, wherein the selected sensor is a first selected sensor, and wherein changing the weight that is assigned to data received from the first selected sensor comprises assigning a lower weight to data received from the first selected sensor relative to data received from a second selected sensor responsive to an indication of a reduction in the reliability of the first selected sensor.

20. The method of claim 19, wherein the reduction in the reliability of the first selected sensor is determined based on a geographical area of the vehicle or a driving condition of the vehicle.

* * * * *